US012100834B2

(12) United States Patent
Ma et al.

(10) Patent No.: US 12,100,834 B2
(45) Date of Patent: Sep. 24, 2024

(54) POSITIVE ELECTRODE ACTIVE MATERIAL, METHOD FOR PREPARATION THEREOF, POSITIVE ELECTRODE PLATE, SECONDARY BATTERY AND ELECTRICAL DEVICE CONTAINING THE SAME

(71) Applicant: CONTEMPORARY AMPEREX TECHNOLOGY CO., LIMITED, Ningde (CN)

(72) Inventors: Qingyan Ma, Ningde (CN); Yingjie Guan, Ningde (CN); Yuzhen Zhao, Ningde (CN); Yan Wen, Ningde (CN); Qisen Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/616,052

(22) Filed: Mar. 25, 2024

(65) Prior Publication Data

US 2024/0266516 A1 Aug. 8, 2024

Related U.S. Application Data

(63) Continuation of application No. PCT/CN2022/084872, filed on Apr. 1, 2022.

(51) Int. Cl.
*H01M 4/36* (2006.01)
*C01B 25/45* (2006.01)
(Continued)

(52) U.S. Cl.
CPC ............ *H01M 4/366* (2013.01); *C01B 25/45* (2013.01); *C01B 33/32* (2013.01);
(Continued)

(58) Field of Classification Search
None
See application file for complete search history.

(56) References Cited

U.S. PATENT DOCUMENTS

| 6,387,568 B1 | 5/2002 | Barker et al. | |
|---|---|---|---|
| 2023/0216022 A1* | 7/2023 | Iwashima | H01M 4/366 429/231.8 |
| 2024/0097138 A1* | 3/2024 | Deng | H01M 4/366 |

FOREIGN PATENT DOCUMENTS

| CN | 103682356 A | 3/2014 |
|---|---|---|
| CN | 104577115 A | 4/2015 |

(Continued)

OTHER PUBLICATIONS

International Search Report received in the corresponding International Application PCT/CN2022/084872, mailed Nov. 25, 2022.
(Continued)

*Primary Examiner* — Scott J. Chmielecki
(74) *Attorney, Agent, or Firm* — Kilpatrick Townsend & Stockton LLP

(57) ABSTRACT

A positive electrode active material, a method for preparation thereof and a positive electrode plate, a secondary battery and an electrical device containing the same are provided. The positive electrode active material has a core-shell structure, comprising a core, a first cladding layer covering the core, a second cladding layer covering the first cladding layer, wherein the core has a chemical formula of $Li_aA_xMn_{1-y}B_yP_{1-z}C_zO_{4-n}D_n$, the first cladding layer comprises a first polymer containing an electron withdrawing group, the second cladding layer comprises a second polymer, and wherein the second polymer comprises one or more of plant polysaccharides, marine polysaccharides and the derivatives thereof. The positive electrode active material of the present application enables a secondary battery to have a relatively high energy density, while further having a (Continued)

significantly improved rate performance, cycling performance and/or high-temperature stability.

23 Claims, 3 Drawing Sheets

(51) Int. Cl.
- C01B 33/32 (2006.01)
- H01M 4/02 (2006.01)
- H01M 4/1315 (2010.01)
- H01M 4/137 (2010.01)
- H01M 4/505 (2010.01)
- H01M 4/60 (2006.01)

(52) U.S. Cl.
CPC ......... *H01M 4/1315* (2013.01); *H01M 4/137* (2013.01); *H01M 4/505* (2013.01); *H01M 4/604* (2013.01); *H01M 4/608* (2013.01); *C01P 2002/52* (2013.01); *C01P 2002/72* (2013.01); *C01P 2002/85* (2013.01); *C01P 2006/40* (2013.01); *H01M 2004/028* (2013.01)

(56) References Cited

FOREIGN PATENT DOCUMENTS

| | | |
|---|---|---|
| CN | 104953118 A | 9/2015 |
| CN | 105576217 A | 5/2016 |
| CN | 105810940 A | 7/2016 |
| CN | 106803574 A | 6/2017 |
| CN | 107834033 A | 3/2018 |
| CN | 109309207 A | 2/2019 |
| CN | 110720153 A | 1/2020 |
| WO | 2017026269 A1 | 2/2017 |

OTHER PUBLICATIONS

Written Opinion of ISA received in the corresponding International Application PCT/CN2022/084872, mailed Nov. 25, 2022.

* cited by examiner

POSITIVE ELECTRODE ACTIVE MATERIAL, METHOD FOR PREPARATION THEREOF, POSITIVE ELECTRODE PLATE, SECONDARY BATTERY AND ELECTRICAL DEVICE CONTAINING THE SAME

CROSS-REFERENCE TO RELATED APPLICATION

This application is a continuation of International Application No. PCT/CN2022/084872, filed on Apr. 1, 2022, which is hereby incorporated by reference in its entirety.

TECHNICAL FIELD

The present application belongs to the technical field of battery, in particular to a positive electrode active material, a method for preparation thereof and a positive electrode plate, a secondary battery and an electrical device containing the same.

BACKGROUND

In recent years, secondary batteries have been widely used in energy storage power systems such as hydro, thermal, wind and solar power plants, as well as electric tools, electric bicycles, electric motorcycles, electric vehicles, military equipment, aerospace and many other fields. With the application and promotion of secondary batteries, their safety performances are receiving more and more attention. Lithium manganese phosphate has become one of the most popular positive electrode active materials due to its high capacity, good safety performance and abundant raw material sources, however, lithium manganese phosphate is prone to manganese ion leaching out during charging, resulting in rapid capacity decay. Therefore, it is necessary to provide a positive electrode active material with good overall performance.

SUMMARY

An object of the present application is to provide a positive electrode active material, a method for the preparation thereof, and a positive electrode plate, a secondary battery and an electrical device comprising the same, which material enables the secondary battery to have a relatively high energy density, while further having a significantly improved rate performance, cycling performance and/or high-temperature stability.

A first aspect of the present application provides a positive electrode active material having a core-shell structure, comprising a core, a first cladding layer covering the core and a second cladding layer covering the first cladding layer, wherein the core has a chemical formula of $Li_aA_xMn_{1-y}B_yP_{1-z}C_zO_{4-n}D_n$, in which A comprises one or more elements selected from Zn, Al, Na, K, Mg, Nb, Mo and W, B comprises one or more elements selected from Ti, V, Zr, Fe, Ni, Mg, Co, Ga, Sn, Sb, Nb, and Ge, C comprises one or more elements selected from B (boron), S, Si, and N, D comprises one or more elements selected from S, F, Cl, and Br, a is in the range of 0.9 to 1.1, x is in the range of 0.001 to 0.1, y is in the range of 0.001 to 0.5, z is in the range of 0.001 to 0.1, n is in the range of 0.001 to 0.1, and the core is electrically neutral; the first cladding layer comprises a first polymer containing an electron withdrawing group; the second cladding layer comprises a second polymer, and the second polymer comprises one or more of plant polysaccharides, marine polysaccharides and the derivatives thereof.

In the present application, by doping the compound $LiMnPO_4$ with specific elements in specific amounts at Li, Mn, P and O sites at the same time, it is allowed to obtain improved rate performance while reducing the leaching out of Mn and Mn-site doping elements, thereby obtaining improved cycling performance and/or high-temperature stability, and the specific capacity and compaction density of the positive electrode active material can also be improved. The present application is able to significantly reduce the leaching out of Mn and Mn-site doping elements and mitigate the erosion of acids in the electrolyte on the surface of the positive electrode active material by applying a first cladding layer and a second cladding layer onto the surface of the core, and thus is able to significantly improve cycling performance and/or high-temperature stability of batteries.

In some embodiments of the present application, the electron withdrawing group comprises one or more selected from halogen atoms, —CN, —COOH, —$SO_3H$, carboxylate groups, sulfonate groups, amide groups, sulfonyl groups, alkoxy groups, phosphoric acid groups, phosphorous acid groups, phosphate groups, and phosphite groups. These electron withdrawing groups are able to stabilize $Mn^{3+}$ on the surface of the core material, thus significantly reducing the leaching out of Mn and Mn-site doping elements.

In some embodiments of the present application, the first polymer comprises a monomer unit shown in Formula 1

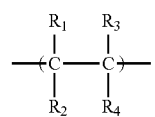

Formula 1

$R_1$, $R_2$, $R_3$, and $R_4$ each independently represent H, an electron withdrawing group, and an unsubstituted or an electron withdrawing group-substituted group selected from the group consisting of C1 to C20 alkyl, C1 to C20 alkoxy, C2 to C20 alkenyl, C2 to C20 alkynyl, and C6 to C20 aryl, and at least one of $R_1$, $R_2$, $R_3$, and $R_4$ represents an electron withdrawing group, or an electron withdrawing group-substituted group selected from the group consisting of C1 to C20 alkyl, C1 to C20 alkoxy, C2 to C20 alkenyl, C2 to C20 alkynyl, and C6 to C20 aryl.

In some embodiments of the present application, the first polymer comprises one or more of a homopolymer formed by one kind of monomer unit shown in Formula 1, a copolymer formed by at least two kinds of monomer units shown in Formula 1, and a copolymer formed by at least one kind of monomer unit shown in Formula 1 and at least one ethylenically unsaturated monomer unit. Optionally, the ethylenically unsaturated monomer unit comprises one or more of styrene, ethylene, propylene, and butadiene.

In some embodiments of the present application, the first polymer comprises one or more selected from homopolymers or copolymers of acrylate monomers; polyacrylonitrile; polyacrylamide; copolymers of acrylate monomers and ethylenically unsaturated monomers; copolymers of acrylonitrile and ethylenically unsaturated monomers; copolymers of acrylamide and ethylenically unsaturated monomers; copolymers of acrylate monomers and acrylonitrile; copolymers of acrylate monomers and acrylamide; copolymers of acrylonitrile and acrylamide; copolymers of acrylate monomers, acrylonitrile and acrylamide; copolymers of acrylate monomers, acrylonitrile, acrylamide, and ethylenically unsaturated monomers; halogen-substituted polyolefin; polystyrene malonic acid; polystyrene phosphorous acid; poly(2-acrylamido-2-methyl-1-propanesulfonic acid); nitrile rubber; mercaptan resin; and polyacrylic acid mercaptan resin.

Optionally, the acrylate monomer comprises one or more selected from acrylic acid, methacrylic acid, methyl acrylate, ethyl acrylate, methyl methacrylate, ethyl methacrylate, butyl methacrylate, and cyanoacrylate.

Optionally, the halogen-substituted polyolefin comprises one or more selected from polyvinylidene fluoride, tetrafluoroethylene-ethylene copolymer, polyvinylidene chloride, and polychloromethylstyrene.

In some embodiments of the present application, the substituent attached to the sugar unit in the second polymer comprises at least one of the group selected from the following functional groups: —OH, —COOH and the salts thereof, —R—OH, —SO$_3$H and the salts thereof, —R—OH, —R—SO$_3$H and the salts thereof, sulphate group, alkoxy group, and R represents alkylidene, optionally, C1~C5 alkylidene.

Optionally, the substituent attached to the sugar unit in the second polymer comprises at least one of the group selected from the following functional groups: —OH, —COOH, —COOLi, —COONa, —COOK, —SO$_3$H, —SO$_3$Li, —SO$_3$Na, —SO$_3$K, —CH$_2$—SO$_3$H, —CH$_2$—SO$_3$Li, —CH$_2$—SO$_3$Na, —CH$_2$—SO$_3$K, methoxy, and ethoxy.

In some embodiments of the present application, the plant polysaccharide comprises one or more selected from pectin, carboxymethyl starch, hydroxypropyl starch, dextrin, cellulose ether, carboxymethyl chitosan, hydroxyethyl cellulose, carboxymethyl cellulose, carboxypropylmethyl cellulose, guar gum, sesbania gum, gum arabic, and the modified polymers thereof.

In some embodiments of the present application, the marine polysaccharide comprises one or more selected from lithium alginate, sodium alginate, potassium alginate, fucoidan, agar, carrageenan, carrageenin, xanthan gum, fenugreek gum and the modified polymers thereof.

In some embodiments of the present application, the first polymer has a number average molecular weight of 10,000 to 300,000, optionally of 15,000 to 250,000.

In some embodiments of the present application, the second polymer has a number average molecular weight of 10,000 to 150,000, optionally of 50,000 to 100,000.

The number average molecular weight of the first and second polymer within the suitable ranges further allows the positive electrode active material to have both good kinetic performance and high-temperature stability.

In some embodiments of the present application, the electron withdrawing group is present in a mass percentage a in the first polymer, with a being from 30% to 70%, optionally from 35% to 65%, which allows better coating modification effect.

In some embodiments of the present application, the substituents attached to the sugar units is present in a mass percentage β in the second polymer, with β being from 20% to 85%, optionally from 30% to 78%, which allows better coating modification effect.

In some embodiments of the present application, the first cladding layer has a coating amount W1, with W1 being greater that 0 wt % and less than or equal to 2.5 wt %, optionally greater that 0 wt % and less than or equal to 2 wt %, based on the weight of the core, which allows better coating modification effect.

In some embodiments of the present application, the second cladding layer has a coating amount W2, with W2 being greater that 0 wt % and less than or equal to 2 wt %, optionally greater that 0 wt % and less than or equal to 1.5 wt %, based on the weight of the core, which allows better coating modification effect.

In some embodiments of the present application, W1+W2≤3.5 wt %, optionally W1+W2≤3 wt %. As a result, the positive electrode active material can simultaneously have good kinetic performance, cycling performance and high-temperature stability.

In some embodiments of the present application, the first cladding layer is disposed on 60% to 95% of the surface of the core, optionally 70% to 85% of the surface. As a result, the coating modification effect on the core is better, thereby the cycling performance and/or high temperature stability of the battery can be further improved.

In some embodiments of the present application, the second cladding layer is disposed on 40% to 80% of the surface of the first cladding layer, optionally 50% to 70% of the surface. As a result, the coating modification effect on the first cladding layer is better, thereby the cycling performance and/or high temperature stability of the battery can be further improved.

In some embodiments of the present application, each of A, C and D is independently any one element in the above-mentioned respective range, and B is at least two elements in the above-mentioned range.

Optionally, A is any one element selected from Mg and Nb.

Optionally, B is at least two elements selected from Fe, Ti, V, Co and Mg, further being the combination of Fe with one or more element selected from Ti, V, Co and Mg.

Optionally, C is S.

Optionally, D is F.

This enables further improvement of the rate performance, energy density and/or high-temperature stability of batteries.

In some embodiments of the present application, x is selected from the range of 0.001 to 0.005. As a result, the kinetic performance of the positive electrode active material can be further improved.

In some embodiments of the present application, y is selected from the range of 0.01 to 0.5, optionally from the range of 0.25 to 0.5. As a result, the specific capacity and rate performance of the positive electrode active material can be further improved.

In some embodiments of the present application, z is selected from the range of 0.001 to 0.005. As a result, the rate performance of batteries can be further improved.

In some embodiments of the present application, n is selected from the range of 0.001 to 0.005. As a result, the high-temperature stability of batteries can be further improved.

In some embodiments of the present application, the ratio of (1−y):y is in the range of 1 to 4, optionally in the range of 1.5 to 3, and the ratio of a:x is in the range of 9 to 1100, optionally in the range of 190 to 998. As a result, the energy density and cycling performance of batteries can be further improved.

In some embodiments of the present application, the positive electrode active material has a lattice change rate of 8% or less, optionally 4% or less. As a result, the rate performance of batteries can be improved.

In some embodiments of the present application, the positive electrode active material has a Li/Mn anti-site defect concentration of 2% or less, optionally 0.5% or less.

As a result, the specific capacity and rate performance of the positive electrode active material can be improved.

In some embodiments of the present application, the positive electrode active material has a surface oxygen valence of −1.82 or less, optionally −1.89 to −1.98. Thus, the cycling performance and high-temperature stability of batteries can be improved.

In some embodiments of the present application, the positive electrode active material has a compaction density of 2.0 g/cm$^3$ or more, optionally 2.2 g/cm$^3$ or more, at 3T. As a result, the bulk energy density of batteries can be increased.

A second aspect of the present application provides a method for preparing a positive electrode active material, comprising Step (1), dissolving a manganese source, a source of element B and an acid in a solvent and stirring to produce a suspension of a manganese salt doped with element B, filtering the suspension and drying the resulting filter cake to obtain the manganese salt doped with element B;

Step (2), adding a lithium source, a phosphorus source, a source of element A, a source of element C and a source of element D, a solvent and the manganese salt doped with element B obtained from step (1) to a reaction vessel for grinding and mixing to obtain a slurry;

Step (3), transferring the slurry obtained from step (2) to a spray drying equipment for spray drying and granulating to obtain granules;

Step (4), sintering the granules obtained from step (3) to obtain a core;

Step (5), mixing the core obtained from step (4) with a solution of a first polymer containing an electron withdrawing group homogeneously and then drying to obtain a material covered by a first cladding layer;

Step (6), mixing the material covered by the first cladding layer obtained from step (5) with a solution of a second polymer homogeneously and then drying to obtain the positive electrode active material, wherein the second polymer comprises one or more of plant polysaccharides, marine polysaccharides and the derivatives thereof;

wherein the positive electrode active material has a core-shell structure, comprising a core, a first cladding layer covering the core and a second cladding layer covering the first cladding layer, wherein the core has a chemical formula of $Li_aA_xMn_{1-y}B_yP_{1-z}C_zO_{4-n}D_n$, in which A comprises one or more elements selected from Zn, Al, Na, K, Mg, Nb, Mo and W, B comprises one or more elements selected from Ti, V, Zr, Fe, Ni, Mg, Co, Ga, Sn, Sb, Nb, and Ge, C comprises one or more elements selected from B (boron), S, Si, and N, D comprises one or more elements selected from S, F, Cl, and Br, a is in a range of 0.9 to 1.1, x is in a range of 0.001 to 0.1, y is in a range of 0.001 to 0.5, z is in a range of 0.001 to 0.1, n is in a range of 0.001 to 0.1, and the core is electrically neutral;

wherein the first cladding layer comprises the polymer containing an electron withdrawing group; and wherein the second cladding layer comprises a second polymer, the second polymer comprises one or more of plant polysaccharides, marine polysaccharides and the derivatives thereof.

In some embodiments of the present application, the source of element A is at least one selected from elemental substance, oxides, phosphates, oxalates, carbonates and sulfates of element A, the source of element B is at least one selected from elemental substance, oxides, phosphates, oxalates, carbonates and sulfates of element B, the source of element C is at least one selected from sulfates, borates, nitrates and silicates of element C, the source of element D is at least one selected from elemental substance and ammonium salts of element D. As a result, the performance of the positive electrode active material can be improved by selecting the source of each doping element within the above corresponding range.

In some embodiments of the present application, stirring in the step (1) is carried out at a temperature in the range of 60-120° C.

In some embodiments of the present application, stirring in the step (1) is carried out by stirring at a rate of 200-800 rpm.

In some embodiments of the present application, grinding and mixing in the step (2) are carried out for 8-15 hours.

Thus, by controlling the reaction temperature, stirring rate and mixing time during doping, uniform distribution of doping elements and higher crystallinity of the material after sintering can be achieved, and thus the specific capacity and rate performance of the positive electrode active material can be improved.

In some embodiments of the present application, the sintering in the step (4) is carried out at a temperature in the range of 600-900° C. for 6-14 hours. As a result, the high-temperature stability and cycling performance of batteries can be improved.

A third aspect of the present application provides a positive electrode plate comprising a positive electrode current collector and a positive electrode film layer provided on at least one surface of the positive electrode current collector, wherein the positive electrode film layer comprises the positive electrode active material of the first aspect of the present application or the positive electrode active material prepared by the method of the second aspect of the present application, and the positive electrode active material is present in the positive electrode film layer in a content of 10 wt % or more.

In some embodiments of the present application, the positive electrode active material is present in the positive electrode film layer in a content of 95-99.5 wt %, based on the total weight of the positive electrode film layer. When the content of the positive electrode active material is within the above-mentioned range, it is conducive to fully utilizing the advantages of the positive electrode active material of the present application.

A fourth aspect of the present application provides a secondary battery comprising the positive electrode active material of the first aspect of the present application, or the positive electrode active material prepared by the method of the second aspect of the present application, or the positive electrode plate of the third aspect of the present application.

A fifth aspect of the present application provides an electrical device comprising the secondary battery of the fourth aspect of the present application.

The positive electrode plate, the secondary battery, and the electrical device of the present application include the positive electrode active material of the present application, and thus have at least the same advantages as the positive electrode active material.

DESCRIPTION OF THE DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on the accompanying drawings without creative work.

Figure 1:
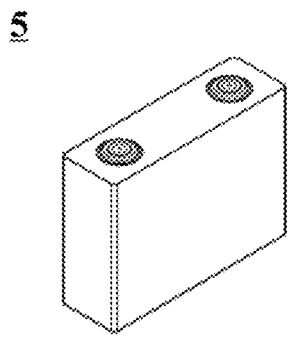
FIG. 1 is a schematic diagram of a secondary battery according to an embodiment of the present application.

In the drawings, the accompanying drawings are not necessarily drawn to an actual scale. Among them, the reference sings in the accompanying drawings are illustrated as follows: 1—battery pack, 2—upper case, 3—lower case, 4—battery module, 5—secondary battery, 51—housing, 52—electrode assembly, and 53—cover plate.

DETAILED DESCRIPTION

Hereinafter, embodiments of the positive electrode active material, the method for the preparation thereof, the positive electrode plate, the secondary battery, and the electrical device containing the same will be described in detail with reference to the accompanying drawings as appropriate. However, unnecessary detailed descriptions may be omitted in some cases, for example the detailed description of a well-known item or the repetitive description of an actually identical structure, so as to prevent the following description from becoming unnecessarily redundant and to facilitate understanding by those skilled in the art. In addition, the drawings and the following description are provided for those skilled in the art to fully understand the present application, and are not intended to limit the subject matter described in the claims.

The "range(s)" disclosed in this application is/are defined in the form of lower and upper limits, and a given range is defined by selection of a lower limit and an upper limit that define boundary of the particular range. Ranges defined in this manner may or may not be inclusive of the endpoints, and may be arbitrarily combined. That is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present application can be combined with each other to form a new technical solution, and such technical solution should be considered to be included in the disclosure of the present application.

Unless stated otherwise, all technical features and optional technical features of the present application can be combined with each other to form a new technical solution, and such technical solution should be considered to be included in the disclosure of the present application.

Unless stated otherwise, all steps of the present application can be carried out sequentially, and also can be carried out randomly, preferably they are carried out sequentially. For example, the method includes steps (a) and (b), indicating that the method may include steps (a) and (b) performed in sequence, or that the method may include steps (b) and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

Unless stated otherwise, the transition phases "comprise", "comprising", "contain" and "containing" mentioned in the present application mean that it is drafted in an open mode, or it may also mean a close mode. For example, the transition phases "comprise", "comprising", "contain" and "containing" may mean that other components not listed may also be included or contained, or only the listed components may be included or contained.

In the present application herein, unless otherwise stated, the term "or" is inclusive. For example, the phrase "A or B" means "A, B, or both A and B". More specifically, any of the following conditions meets "A or B": A is true (or present) and B is false (or absent); A is false (or absent) and B is true (or present); or both A and B are true (or present).

In the present application, an "approximate" value indicates a range of that the specified value ±10%.

It should be noted that as used herein, the term "cladding layer" refers to a layer of material that covers the core of lithium manganese phosphate, and that the layer of material may completely or partially cover the core of lithium manganese phosphate, and that the term "cladding layer" is used for descriptive purposes only and is not intended to limit the present invention.

As used herein, the term "copolymer" may be a binary copolymer or multiple copolymer.

As used herein, the term "acrylate monomers" denotes a generic term for esters of acrylic acid, methacrylic acid and their homologues.

The term "sugar unit" refers to a single monosaccharide attached to one or more other monosaccharide units, which sometimes refer to sugar residues. The term "polysaccharide" refers to a macromolecule consisting of a large number of sugar units linked to each other by glycosidic bonds; when all the sugar units in a polysaccharide are of the same type, the polysaccharide is referred to as a homopolysaccharide or homopolymerized sugar, and when more than one type of sugar unit is present they are referred to as heteropolysaccharides or heteropolysaccharides.

The inventors of the present application have deeply studied the effects of doping of lithium manganese phosphate with various elements at Li, Mn, P and O sites and found that by doping the lithium manganese phosphate with specific elements in specific amounts at the above four sites and coating its surface with a cladding layer, the significantly improved rate performance, cycling performance and high-temperature stability can be obtained, resulting in an improved lithium manganese phosphate positive electrode active material.

Positive Electrode Active Material

Specifically, a first aspect of the present application provides a positive electrode active material having a core-shell structure, comprising a core, a first cladding layer covering the core and a second cladding layer covering the first cladding layer, wherein the core has a chemical formula of $Li_aA_xMn_{1-y}B_yP_{1-z}C_zO_{4-n}D_n$, in which A comprises one or more elements selected from Zn, Al, Na, K, Mg, Nb, Mo and W, B comprises one or more elements selected from Ti, V, Zr, Fe, Ni, Mg, Co, Ga, Sn, Sb, Nb, and Ge, C comprises one or more elements selected from B (boron), S, Si, and N, D comprises one or more elements selected from S, F, Cl, and Br, a is in the range of 0.9 to 1.1, x is in the range of 0.001 to 0.1, y is in the range of 0.001 to 0.5, z is in the range of 0.001 to 0.1, n is in the range of 0.001 to 0.1, and the core is electrically neutral; the first cladding layer comprises a first polymer containing an electron withdrawing group; the second cladding layer comprises a second polymer, and the second polymer comprises one or more of plant polysaccharides, marine polysaccharides and the derivatives thereof.

Unless otherwise stated, in the above chemical formula, when A represents more than two elements, the above range for the x value is not only for the stoichiometric number of each element as A, but also for the sum of the stoichiometric numbers of each element as A. For example, when A represents more than two elements A1, A2 . . . and An, each of the respective stoichiometric numbers x1, x2 . . . and xn of respective A1, A2 . . . and An must fall within the numerical range defined by the present application for x, and the sum of x1, x2 . . . and xn must also fall within such numerical range of the present application. Similarly, in the case where B, C and D are more than two elements, the limitations on numerical ranges for the stoichiometric numbers of B, C and D in the present application also have the above meaning.

The core of the positive electrode active material of the present application is obtained by doping the compound $LiMnPO_4$ with various elements, wherein A, B, C and D are elements for doping at the Li, Mn, P and O sites of the compound $LiMnPO_4$, respectively. Without wishing to be bound by theory, it is now believed that the improvement of performances of lithium manganese phosphate is related to the reduction of the lattice change rate of lithium manganese phosphate in the process of intercalation and de-intercalation of lithium ions and the reduction of surface activity. The reduction of the lattice change rate can reduce the difference in lattice constants between two phases at the grain boundary, reduce the interfacial stress, enhance the $Li^+$ transport at the interface, and thus improve the rate performance of the positive electrode active material. High surface activity tends to lead to serious interfacial side reactions, which intensify gas production, electrolyte consumption and interface damage, thus affecting the cycling performance of batteries. In this application, the lattice change rate is reduced by doping at Li and Mn sites. The Mn-site doping also effectively reduces the surface activity, thus inhibiting the leaching out of manganese ion and the interfacial side reactions between the positive electrode active material and the electrolyte. The P-site doping results in a faster change rate of Mn—O bond length and reduces migration barrier of small polaron of the material, thus contributing to the enhancement of electronic conductivity. The O-site doping has a good effect on reducing the interfacial side reactions. The doping at the P- and O-sites also has an effect on the leaching out of manganese ion and kinetic properties of the anti-site defects.

Thus, doping reduces the concentration of anti-site defects in the positive electrode active material, improves the kinetic performance and specific capacity of the positive electrode active material, and also changes the morphology of particles, thus enhancing the compaction density. The inventors of the present application unexpectedly found that by doping the compound $LiMnPO_4$ with specific elements in specific amounts at Li, Mn, P and O sites at the same time, it is allowed to obtain improved rate performance while reducing the leaching out of Mn and Mn-site doping elements, thereby obtaining improved cycling performance and/or high-temperature stability, and the specific capacity and compaction density of the positive electrode active material can also be improved. Optionally, A is one or more elements selected from Zn, Al, Na, K, Mg, Nb, Mo and W, B is one or more elements selected from Ti, V, Zr, Fe, Ni, Mg, Co, Ga, Sn, Sb, Nb and Ge, C is one or more elements selected from B (boron), S, Si and N, and D is one or more elements selected from S, F, Cl and Br.

A first cladding layer and a second cladding layer is disposed on the surface of the core, and can separate materials of the core from an electrolytic solution to avoid direct contact between the materials of the core and the electrolytic solution and thus to reduce interfacial side reactions. The first cladding layer is in direct contact with the inner core and includes a first polymer containing an electron withdrawing group that can stabilize $Mn^{3+}$ on the surface of the core material, thus significantly reducing the leaching out of Mn and Mn-site doping elements. Optionally, the electron withdrawing group comprises one or more selected from halogen atoms, —CN, —COOH, —$SO_3H$, carboxylate groups, sulfonate groups, amide groups, sulfonyl groups, alkoxy groups, phosphoric acid groups, phosphorous acid groups, phosphate groups, and phosphite groups. The second cladding layer comprises polysaccharides and derivatives thereof, which can combine with Lewis acids such as $PF_5$ in the electrolyte to reduce the generation of HF, thereby alleviating the erosion of the surface of the positive electrode active material by the acid in the electrolyte. In the present application, polysaccharide derivatives include, but are not limited to, acidified (sulfated, sulfonated, phosphorylated), acetylated polysaccharides.

Thus, after the first cladding layer and the second cladding layer are covered on the surface of the inner core, the leaching out of Mn and Mn-site doping elements can be significantly reduced, the erosion of the surface of the positive electrode active material by the acidic substances in the electrolyte can be alleviated, and thus the cycling performance and/or the high temperature stability of the battery can be significantly improved.

It should be noted that the XRD spectra before and after the doping of $LiMnPO_4$ in this application reveal that the positions of the primary characteristic peaks of the positive electrode active material of this application are basically the same as those before the doping of $LiMnPO_4$, indicating that the doped lithium manganese phosphate positive electrode active material has no impurity phase and the improvement of battery performances is mainly caused by the doping of elements rather than by the impurity phase.

In some embodiments, each of A, C and D is independently any one element in the above-mentioned respective range, and B is at least two elements in the above-mentioned range. This enables easier and more accurate control of the composition of the core of the positive electrode active material.

Optionally, A is any one element selected from Mg and Nb.

Optionally, B is at least two elements selected from Fe, Ti, V, Co and Mg, optionally being Fe with more than one element selected from Ti, V, Co and Mg.

Optionally, C is S.

Optionally, D is F.

By selecting the Li-site doping element within the above range, the lattice change rate during the delithiation process can be further reduced, thereby further improving the rate performance of batteries. By selecting the Mn-site doping element in the above range, the electronic conductivity can be further improved and the lattice change rate can be further reduced, thus improving the rate performance and energy density of batteries. By selecting the P-site doping element in the above range, the rate performance of batteries can be further improved. By selecting the O-site doping element in the above range, the side reactions at the interface can be further reduced and the high-temperature stability of batteries can be improved.

a is selected from the range of 0.9 to 1.1, for example, 0.97, 0.977, 0.984, 0.988, 0.99, 0.991, 0.992, 0.993, 0.994, 0.995, 0.996, 0.997, 0.998, and 1.01.

x is selected from the range of 0.001 to 0.1, for example, 0.001, and 0.005.

y is selected from the range of 0.001 to 0.5, such as 0.001, 0.005, 0.02, 0.05, 0.1, 0.15, 0.2, 0.25, 0.3, 0.34, 0.345, 0.349, 0.35, and 0.4.

z is selected from a range of 0.001 to 0.1, such as 0.001, 0.005, 0.08, and 0.1, and n is selected from a range of 0.001 to 0.1, such as 0.001, 0.005, 0.08, and 0.1.

In some embodiments, x is selected from the range of 0.001 to 0.005.

In some embodiments, y is selected from a range of 0.01 to 0.5, optionally from a range of 0.25 to 0.5.

In some embodiments, z is selected from the range of 0.001 to 0.005.

In some embodiments, n is selected from the range of 0.001 to 0.005.

The kinetic performance of the positive electrode active material can be further enhanced by selecting the x value within the above range. The specific capacity and rate performance of the positive electrode active material can be further enhanced by selecting the y value within the above range. By selecting the z value within the above range, the rate performance of batteries can be further improved. The high-temperature stability of batteries can be further improved by selecting the n value within the above range.

In some embodiments of the present application, the core of the positive electrode active material satisfies the ratio of (1-y):y within the range of 1 to 4, optionally in the range of 1.5 to 3, and the ratio of a:x within the range of 9 to 1100, optionally in the range of 190 to 998. Here y denotes the sum of the stoichiometric numbers of the Mn-site doping elements. The energy density and cycling performance of batteries can be further improved when the above conditions are satisfied.

In some embodiments of the present application, the first polymer comprises a monomer unit shown in Formula 1

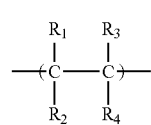

Formula 1

$R_1$, $R_2$, $R_3$, and $R_4$ each independently represent H, an electron withdrawing group, and an unsubstituted or an electron withdrawing group-substituted group selected from the group consisting of C1 to C20 alkyl, C1 to C20 alkoxy, C2 to C20 alkenyl, C2 to C20 alkynyl, and C6 to C20 aryl, and at least one of $R_1$, $R_2$, $R_3$, and $R_4$ represents an electron withdrawing group, or an electron withdrawing group-substituted group selected from the group consisting of C1 to C20 alkyl, C1 to C20 alkoxy, C2 to C20 alkenyl, C2 to C20 alkynyl, and C6 to C20 aryl.

In some embodiments of the present application, the first polymer comprises one or more of a homopolymer formed by one kind of monomer unit shown in Formula 1, a copolymer formed by at least two kinds of monomer units shown in Formula 1, and a copolymer formed by at least one kind of monomer unit shown in Formula 1 and at least one ethylenically unsaturated monomer unit.

Optionally, the ethylenically unsaturated monomer unit comprises one or more of styrene, ethylene, propylene, and butadiene.

As an example, the first polymer comprises one or more selected from homopolymers or copolymers of acrylate monomers; polyacrylonitrile; polyacrylamide; copolymers of acrylate monomers and ethylenically unsaturated monomers; copolymers of acrylonitrile and ethylenically unsaturated monomers; copolymers of acrylamide and ethylenically unsaturated monomers; copolymers of acrylate monomers and acrylonitrile; copolymers of acrylate monomers and acrylamide; copolymers of acrylonitrile and acrylamide; copolymers of acrylate monomers, acrylonitrile and acrylamide; copolymers of acrylate monomers, acrylonitrile, acrylamide, and ethylenically unsaturated monomers; halogen-substituted polyolefin; polystyrene malonic acid; polystyrene phosphorous acid; poly(2-acrylamido-2-methyl-1-propanesulfonic acid); nitrile rubber; mercaptan resin; and polyacrylic acid mercaptan resin.

Optionally, the acrylate monomers comprise one or more selected from acrylic acid, methacrylic acid, methyl acrylate, ethyl acrylate, methyl methacrylate, ethyl methacrylate, butyl methacrylate, and cyanoacrylate.

Optionally, the halogen-substituted polyolefin comprises one or more selected from polyvinylidene fluoride, tetrafluoroethylene-ethylene copolymer, polyvinylidene chloride, and polychloromethylstyrene.

In some embodiments, the substituent attached to the sugar unit in the second polymer comprises at least one of the group selected from the following functional groups: —OH, —COOH and the salts thereof, —R—OH, —SO₃H and the salts thereof, —R—OH, —R—SO₃H and the salts thereof, sulphate group, alkoxy group, and R represents alkylidene, optionally, C1~C5 alkylidene. As used herein, the term "substituents attached to the sugar unit" includes all groups attached to the backbone of the sugar unit.

Optionally, the substituent attached to the sugar unit in the second polymer comprises at least one of the group selected from the following functional groups: —OH, —COOH, —COOLi, —COONa, —COOK, —SO$_3$H, —SO$_3$Li, —SO$_3$Na, —SO$_3$K, —CH$_2$—SO$_3$H, —CH$_2$—SO$_3$Li, —CH$_2$—SO$_3$Na, —CH$_2$—SO$_3$K, methoxy, and ethoxy.

As an example, the plant polysaccharide comprises one or more selected from pectin, carboxymethyl starch, hydroxypropyl starch, dextrin, cellulose ether, carboxymethyl chitosan, hydroxyethyl cellulose, carboxymethyl cellulose, carboxypropylmethyl cellulose, guar gum, sesbania gum, gum arabic, and the modified polymers thereof.

As an example, the marine polysaccharide comprises one or more selected from lithium alginate, sodium alginate, potassium alginate, fucoidan, agar, carrageenan, carrageenin, xanthan gum, fenugreek gum and the modified polymers thereof.

In some embodiments of the present application, the first polymer has a number average molecular weight of 10,000 to 300,000, for example it may be 15,000 to 250,000, 15,000 to 200,000, 15,000 to 180,000, 50,000 to 250,000, 50,000 to 200,000, 50,000 to 180,000.

In some embodiments of the present application, the second polymer has a number average molecular weight of 10,000 to 150,000, for example it may be 15,000 to 120,000, 15,000 to 100,000, 15,000 to 80,000, 50,000 to 150,000, 50,000 to 120,000, 50,000 to 100,000, 50,000 to 80,000.

When the number average molecular weight of the first polymer and the second polymer is within the suitable ranges, it is also possible to combine good kinetic properties and high-temperature stability of the positive electrode active material. In addition, the following conditions may be effectively avoided: if the number average molecular weight of the first polymer is too small, the film formation effect on the surface of core may be poor, and the cladding modification effect on the core may not be observed, and the effect of inhibiting the leaching out of Mn and Mn-site doping element may be poor; and if the number average molecular weight of the first polymer is too high, the force between polymers may be too strong, and the positive electrode active material may be easily agglomerated, which may reduce kinetic performance of the positive electrode active material, and may also lead to poor cladding modification effect, for example, the first cladding layer tends to be uneven in thickness. If the number average molecular weight of the second polymer is too small, the film formation effect on the surface of the first cladding layer may be poor, and it cannot effectively reduce the HF in the electrolyte; and if the number average molecular weight of the second polymer is too high, the force between the second polymers may be too strong, and the positive electrode active material may be easily agglomerated, which may reduce kinetic performance of the positive electrode active material, and may also lead to poor cladding modification effect, for example, the second cladding layer tends to be uneven in thickness The number average molecular weight of the polymer may be determined by methods known in the art, such as by gel permeation chromatography (GPC). A PL-GPC 220 high temperature gel permeation chromatograph may be used for testing.

In some embodiments, the electron withdrawing group is present in a mass percentage α in the first polymer, with a being from 30% to 70%, optionally from 35% to 65%. The mass percentage of the electron withdrawing groups in the first polymer may be determined by methods known in the art, such as by titration (e.g. acid-base titration, redox titration, and precipitation titration), infrared spectroscopy, and nuclear magnetic resonance spectroscopy.

The content of electron withdrawing group in the first polymer within in the suitable ranges allows better cladding modification effect. In addition, the following conditions may be effectively avoided: if the content of electron withdrawing group in the first polymer is too high, the force between the first polymers may be too strong, and the positive electrode active material may be easily agglomerated, which may reduce kinetic performance and cycling performance of the positive electrode active material; if the content of electron withdrawing group in the first polymer is too low, its effect on reducing the leaching out of Mn and Mn-site doping elements may be poor.

In some embodiments, the substituents attached to the sugar units is present in a mass percentage β in the second polymer, with β being from 20% to 85%, optionally from 30% to 78%. The mass percentage of the substituents attached to the sugar units in the second polymer may be determined by methods known in the art, such as by titration (e.g. acid-base titration, redox titration, and precipitation titration), infrared spectroscopy, and nuclear magnetic resonance spectroscopy.

The content of the substituents attached to the sugar units of the second polymer within in the suitable ranges allows better cladding modification effect. In addition, the following conditions may be effectively avoided: if the content of the substituents attached to the sugar units is too high, the force between the second polymers may be too strong, and the positive electrode active material may be easily agglomerated, which may reduce kinetic performance and cycling performance of the positive electrode active material; if the content of the substituents attached to the sugar units is too low, it may not be effective in reducing HF in the electrolyte.

In some embodiments, the first cladding layer has a coating amount W1, with W1 being greater that 0 wt % and less than or equal to 2.5 wt %, optionally greater that 0 wt % and less than or equal to 2 wt %, based on the weight of the core.

The coating amount of the first cladding layer within the suitable ranges allows better cladding modification effect on the core. In addition, the following conditions may be effectively avoided: if the coating amount of the first cladding layer is too low, the effect of cladding modification on the core may not be significant, and the effect of inhibiting the leaching out of Mn and Mn-site doping element may be poor; if the coating amount of the first cladding layer is too high, electronic conductivity and ionic conductivity of the positive electrode active material may deteriorate and battery impedance may increase, which may affect rate performance and cycling performance of batteries.

In some embodiments of the present application, the second cladding layer has a coating amount W2, with W2 being greater that 0 wt % and less than or equal to 2 wt %, optionally greater that 0 wt % and less than or equal to 1.5 wt %, based on the weight of the core.

The coating amount of the second cladding layer within the suitable ranges allows better cladding modification effect on the core and the first cladding layer. In addition, the following conditions may be effectively avoided: if the coating amount of the second cladding layer is too low, the effect of cladding modification may not be significant; if the coating amount of the second cladding layer is too high, electronic conductivity and ionic conductivity of the positive electrode active material may deteriorate and battery impedance may increase, which may affect rate performance and cycling performance of batteries.

In some embodiments of the present application, W1+W2≤3.5 wt %, optionally W1+W2≤3 wt %. As a result, the positive electrode active material can simultaneously have good kinetic performance, cycling performance and high-temperature stability.

In some embodiments, the first cladding layer is disposed on 60% to 95%, optionally 70% to 85%, of the surface of the core. The proportion of the first cladding layer on the surface of the core within the suitable ranges allows better cladding modification effect on the core, thereby further improving cycling performance and/or high-temperature stability of batteries. In addition, the following conditions may be effectively avoided: if the proportion of the first cladding layer on the surface of the core is too high, electronic conductivity and ionic conductivity of the positive electrode active material may deteriorate and battery impedance may increase, which may affect rate performance and cycling performance of batteries; if the proportion of the first cladding layer on the surface of the core is too low, the effect of cladding modification on the core may not be significant, and the effect of inhibiting the leaching out of Mn and Mn-site doping element may be poor.

In some embodiments of the present application, the second cladding layer is disposed on 40% to 80% of the surface of the first cladding layer, optionally 50% to 70% of the surface. The proportion of the second cladding layer on the surface of the core within the suitable ranges allows better cladding modification effect on the first cladding layer, thereby further improving cycling performance and/or high-temperature stability of batteries. In addition, the following conditions may be effectively avoided: if the proportion of the second cladding layer on the surface of the first cladding layer is too high, electronic conductivity and ionic conductivity of the positive electrode active material may deteriorate and battery impedance may increase, which may affect rate performance and cycling performance of batteries; if the proportion of the second cladding layer on the surface of the first cladding layer is too low, its effect of alleviating the erosion of the surface of the positive electrode active material by the acid in the electrolyte may not be significant.

In some embodiments, the positive electrode active material has a lattice change rate of 8% or less, and optionally, the lattice change rate is 4% or less. By reducing the lattice change rate, it allows easier Li ion transport, i.e., Li ions have stronger migration ability in the material, which is conducive to improving the rate performance of batteries. The lattice change rate can be measured by methods known in the art, such as X-ray diffraction mapping (XRD).

In some embodiments, the positive electrode active material has a Li/Mn anti-site defect concentration of 2% or less, optionally the Li/Mn anti-site defect concentration is 0.5% or less. The term Li/Mn anti-site defect refers to interchange of $Li^+$ with $Mn^{2+}$ in terms of its site in the $LiMnPO_4$ lattice. The Li/Mn anti-site defect concentration refers to a percentage of $Li^+$ interchanged with $Mn^{2+}$ in the positive electrode active material relative to the total amount of $Li^+$. The $Mn^{2+}$ ion having an anti-site defect hinders transport of $Li^+$, and by reducing the Li/Mn anti-site defect concentration, it is conducive to improving specific capacity and rate performance of the positive electrode active material. The Li/Mn anti-site defect concentration can be measured by methods known in the art, such as XRD.

In some embodiments, the positive electrode active material has a surface oxygen valence of −1.82 or less, optionally −1.89 to −1.98. By reducing the surface oxygen valence, interfacial side reactions between a positive electrode active material and an electrolytic solution can be mitigated, thereby improving cycling performance and high-temperature stability of batteries. The surface oxygen valence can be measured by methods known in the art, such as by electron energy loss spectroscopy (EELS).

In some embodiments, the positive electrode active material has a compaction density of 2.0 $g/cm^3$ or more, optionally 2.2 $g/cm^3$ or more, at 3T (tonne). The higher the compaction density is, the greater the weight of the positive electrode active material per unit volume is. Thus, increase of the compaction density is conducive to improving volumetric energy density of batteries. Compaction density can be measured according to GB/T 24533-2009.

Preparation Method

A second aspect of the present application provides a method for preparing the positive electrode active material according to the first aspect, comprising Step (1), dissolving a manganese source, a source of element B and an acid in a solvent and stirring them to produce a suspension of a manganese salt doped with element B, filtering the suspension and drying the resulting filter cake to obtain the manganese salt doped with element B;

Step (2), adding a lithium source, a phosphorus source, a source of element A, a source of element C and a source of element D, a solvent and the manganese salt doped with element B obtained from step (1) to a reaction vessel for grinding and mixing to obtain a slurry;

Step (3), transferring the slurry obtained from step (2) to a spray drying equipment for spray drying and granulating to obtain granules;

Step (4), sintering the granules obtained from step (3) to obtain a core;

Step (5), mixing the core obtained from step (4) with a solution of a first polymer containing an electron withdrawing group homogeneously and then drying to obtain a material covered by a first cladding layer;

Step (6), mixing the material covered by the first cladding layer obtained from step (5) with a solution of a second polymer homogeneously and then drying to obtain the positive electrode active material, wherein the second polymer comprises one or more of plant polysaccharides, marine polysaccharides and the derivatives thereof.

In some embodiments, the source of element A is at least one selected from elemental substance, oxides, phosphates, oxalates, carbonates and sulfates of element A, the source of element B is at least one selected from elemental substance, oxides, phosphates, oxalates, carbonates and sulfates of element B, the source of element C is at least one selected from sulfates, borates, nitrates and silicates of element C, and the source of element D is at least one selected from elemental substance and ammonium salts of element D. By selecting the source of each doping element, it is possible to improve distribution uniformity of doping elements, thereby improving performances of the positive electrode active material.

In some embodiments, the acid is one or more selected from hydrochloric acid, sulfuric acid, nitric acid, phosphoric acid, organic acids such as oxalic acid, and the like, which may be oxalic acid, for example. In some embodiments, the acid is a diluted acid with a concentration of 60 wt % or less.

In some embodiments, the manganese source may be a manganese-containing substance known in the art that can be used to prepare lithium manganese phosphate. For example, the manganese source may be one or more selected from elemental manganese, manganese dioxide, manganese phosphate, manganese oxalate, and manganese carbonate.

In some embodiments, the lithium source may be a lithium-containing substance known in the art that can be used to prepare lithium manganese phosphate. For example, the lithium source may be one or more selected from lithium carbonate, lithium hydroxide, lithium phosphate, and lithium dihydrogen phosphate.

In some embodiments, the phosphorus source may be a phosphorus-containing substance known in the art that can be used to prepare lithium manganese phosphate. For example, the phosphorus source may be one or more selected from diammonium hydrogen phosphate, ammonium dihydrogen phosphate, ammonium phosphate and phosphoric acid.

The addition amounts of respective sources of elements A, B, C, and D depends on the target doping amounts, and the ratio of amounts of the lithium, manganese, and phosphorus sources conforms to a stoichiometric ratio.

In some embodiments, the solvents described in step (1) and step (2) may each independently be solvents routinely used by those skilled in the art in the preparation of manganese salts and lithium manganese phosphate, and for example, they may each independently be selected from at least one of ethanol, water (such as deionized water), and the like.

In some embodiments, stirring in step (1) is carried out at a temperature in the range of 60-120° C. In some embodiments, stirring in step (1) is carried out at a rate of 200-800 rpm, or 300-800 rpm, or 400-800 rpm. In some embodiments, stirring in step (1) proceeds for 6-12 hours. In some embodiments, grinding and mixing in step (2) proceed for 8-15 hours.

By controlling the reaction temperature, stirring rate and mixing time during doping, uniform distribution of doping elements and higher crystallinity of materials after sintering can be achieved, which can enhance specific capacity and rate performance of the positive electrode active material.

In some embodiments, the filter cake in step (1) may be washed prior to drying the filter cake.

In some embodiments, drying in step (1) may be performed in a manner and under a condition known to those skilled in the art. For example, the drying may be carried out at a temperature in the range of 120-300° C. Optionally, the filter cake may be ground into particles after drying, for example, into particles having a median particle size $Dv_{50}$ in the range of 50-200 nm. The median particle size $Dv_{50}$ refers to a particle size at which the material has a cumulative volume distribution percentage of 50%. In the present application, the median particle size $Dv_{50}$ of the material can be determined by laser diffraction particle size analysis. For example with reference to standard GB/T 19077-2016, a laser particle size analyzer (e.g. Malvern Master Size 3000) may be used for determination.

The temperature and time of spray drying in step (3) may be the temperature and time routinely used in the art for performing spray drying, e.g., 1-6 hours at 100-300° C.

In some embodiments, sintering in step (4) is carried out at a temperature in the range of 600-900° C. for 6-14 hours. By controlling the sintering temperature and time, it is possible to control crystallinity of the positive electrode active material and reduce the amount of leaching out of Mn and Mn-site doping elements after cycling of the positive electrode active material, thereby improving high-temperature stability and cycling performance of batteries.

In some embodiments, sintering in step (4) is carried out under a protective atmosphere, wherein the protective atmosphere may be nitrogen, inert gas, hydrogen or a mixture thereof.

In some embodiments, drying in step (5) can be performed at a temperature in the range of 50° C. to 160° C., optionally of 60° C. to 150° C., more optionally of 70° C. to 140° C., even more optionally of 80° C. to 130° C., most optionally of 90° C. to 120° C., and the drying can be carried out for a period of 3-9 hours, optionally of 4-8 hours, more optionally of 5-7 hours, most optionally about 6 hours.

In some embodiments, drying in step (6) can be carried out at a temperature in the range of 50° C. to 160° C., optionally of 60° C. to 150° C., more optionally of 70° C. to 140° C., even more optionally of 80° C. to 130° C., and most optionally 90° C. to 120° C., and the drying can be carried out for a period of 3-9 hours, optionally of 4-8 hours, more optionally of 5-7 hours, most optionally about 6 hours.

Positive Electrode Plate

A third aspect of the present application provides a positive electrode plate comprising a positive electrode current collector and a positive electrode film layer provided on at least one surface of the positive electrode current collector, wherein the positive electrode film layer comprises the positive electrode active material of the first aspect of the present application or the positive electrode active material prepared by the method of the second aspect of the present application, and the positive electrode active material is present in the positive electrode film layer in a content of 10 wt % or more, based on the total weight of the positive electrode film layer.

The positive electrode current collector has two surfaces opposite to each other in the direction of its own thickness, and the positive electrode film layer is provided on either or both of two opposite surfaces of the positive electrode current collector.

In some embodiments, the positive electrode active material is present in the positive electrode film layer in a content of 95-99.5 wt %, based on the total weight of the positive electrode film layer. When the content of the positive electrode active material is within the above-mentioned range, it is conducive to fully exerting advantages of the positive electrode active material of the present application.

The positive electrode film layer does not exclude other positive electrode active materials than the positive electrode active material of the first aspect of the present application or the positive electrode active material prepared by the method of the second aspect of the present application. For example, the positive electrode film may also comprise at least one of a lithium transition metal oxide and a modified compound thereof. By way of example, the other positive electrode active materials may include at least one of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof.

In some embodiments, the positive electrode film layer may further optionally comprise a positive electrode conductive agent. In the present application, the type of the positive electrode conductive agent is not particularly limited. As an example, the positive electrode conductive agent comprises at least one of superconducting carbon, conductive graphite, acetylene black, carbon black, Ketjen black, carbon dots, carbon nanotubes, graphene, and carbon nanofibers.

In some embodiments, the positive electrode film layer may further optionally include a positive electrode binder. In the present application, the type of the positive electrode binder is not particularly limited and, as an example, the positive electrode binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylate resin.

In some embodiments, the positive electrode current collector may be a metal foil or a composite collector fluid. As an example of a metal foil, an aluminum foil may be used. The composite collector may include a polymeric material matrix and a metallic material layer formed on at least one surface of the polymeric material matrix. As an example, the metallic material may be selected from at least one of aluminum, aluminum alloy, nickel, nickel alloy, titanium, titanium alloy, silver, and silver alloy. As an example, the polymeric material matrix may be selected from polypropylene (PP), polyethylene terephthalate (PET), polybutylene terephthalate (PBT), polystyrene (PS), polyethylene (PE), etc.

The positive electrode film layer is usually made by applying a positive electrode slurry to the positive electrode collector followed by drying and cold pressing. The positive electrode slurry is usually formed by dispersing the positive electrode active material, an optional conductive agent, an optional binder, and any other components in a solvent and stirring uniformly. The solvent may be N-methylpyrrolidone (NMP), but is not limited thereto.

Secondary Battery

A fourth aspect of the present application provides a secondary battery comprising the positive electrode plate of the third aspect of the present application.

A secondary battery, also known as a rechargeable battery or accumulator, is a battery that can continue to be used by activating its active material by means of charging after the battery has been discharged. Typically, a secondary battery includes an electrode assembly and an electrolyte, and the electrode assembly includes a positive electrode plate, a negative electrode plate, and a separator. The separator is disposed between the positive electrode plate and the negative electrode plate, which mainly functions as preventing short circuit of the positive and negative electrodes and at the same time allowing active ions to pass through. The electrolyte functions as conducting active ions between the positive electrode plate and the negative electrode plate.

[Positive Electrode Plate]

A positive electrode plate used in the secondary battery of this application is the positive electrode plate described in any one of embodiments of the third aspect of this application.

[Negative Electrode Plate]

In some embodiments, the negative electrode plate comprises a negative electrode current collector and a negative electrode film layer provided on at least one surface of the negative electrode current collector and comprising a negative electrode active material. For example, the negative electrode current collector has two surfaces opposite to each other in the direction of its own thickness, and the negative electrode film layer is provided on either or both of two opposite surfaces of the negative electrode current collector.

The negative electrode active material may be a negative electrode active material known in the art for use in secondary batteries. By way of example, the negative electrode active material includes, but is not limited to, at least one of natural graphite, artificial graphite, soft carbon, hard carbon, silicon-based material, tin-based material, and lithium titanate. The silicon-based material may include at least one of elemental silicon, a silicon oxide, a silicon carbon composite, a silicon nitrogen composite, a silicon alloy material. The tin-based materials may include at least one of elemental tin, a tin oxide, and a tin alloy material. The present application is not limited to these materials, and other conventionally known materials that can be used as negative electrode active materials for secondary batteries may also be used. These negative electrode active materials can be used alone, or in combination of two or more materials.

In some embodiments, the negative electrode film layer may also optionally comprise a negative electrode conductive agent. In the present application, the type of the negative electrode conductive agent is not particularly limited and, as an example, the negative electrode conductive agent may include at least one of superconducting carbon, conductive graphite, acetylene black, carbon black, Ketjen black, carbon dots, carbon nanotubes, graphene, and carbon nanofibers.

In some embodiments, the negative electrode film layer may further optionally comprise a negative electrode binder. In the present application, the type of the negative binder is not particularly limited and, as an example, the negative electrode binder may include at least one of styrene-butadiene rubber (SBR), water-soluble unsaturated resin SR-1B, aqueous acrylic resins (e.g., polyacrylic acid PAA, polymethacrylic acid PMAA, polyacrylic acid sodium salt PAAS), polyacrylamide (PAM), polyvinyl alcohol (PVA), sodium alginate (SA), and carboxymethyl chitosan (CMCS).

In some embodiments, the negative electrode film layer may optionally also include other additives. As an example, the other additives may include thickeners, e.g., sodium carboxymethyl cellulose (CMC), and PTC thermistor material, etc.

In some embodiments, the negative electrode current collector may be a metal foil or a composite collector. As an example of a metal foil, a copper foil may be used. The composite collector may include a polymeric material matrix and a metallic material layer formed on at least one surface of the polymeric material matrix. As an example, the metallic material may be selected from at least one of copper, copper alloy, nickel, nickel alloy, titanium, titanium alloy, silver, and silver alloy. As an example, the polymer material matrix may be selected from polypropylene (PP), polyethylene terephthalate (PET), polybutylene terephthalate (PBT), polystyrene (PS), polyethylene (PE), etc.

The negative electrode film layer is usually made by applying a negative electrode slurry to the negative electrode current collector followed by drying and cold pressing. The negative electrode slurry is usually formed by dispersing the negative electrode active material, an optional conductive agent, an optional binder, and any other optional additives in a solvent and stirring uniformly. The solvent may be N-methylpyrrolidone (NMP) and deionized water, but is not limited thereto.

The negative electrode plate does not exclude other additional functional layers than the negative electrode film layer. For example, in some embodiments, the negative electrode plate described in the present application further comprises a conductive primer (e.g. being composed of a conductive agent and a binder) sandwiched between the negative electrode current collector and the negative electrode film layer and disposed on the surface of the negative electrode current collector. In some other embodiments, the negative electrode plate described in this application further comprises a protective layer covering the surface of the negative electrode film layer.

[Electrolyte]

The type of electrolyte is not specifically restricted in the present application, and can be selected by those skilled in the art according to actual requirements. For example, the electrolyte may be at least one selected from solid electrolyte and liquid electrolyte (i.e., electrolytic solution).

In some embodiments, an electrolytic solution is used as the electrolyte. The electrolytic solution includes an electrolyte salt and a solvent.

The type of electrolyte salt is not specifically restricted in the present application, and can be selected by those skilled in the art according to actual requirements. In some embodiments, as an example, the electrolyte salt may comprise at least one of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bis(trifluoromethane sulfonimide) (LiTFSI), lithium trifluoromethane sulfonate (LiTFS), lithium difluorooxalate borate (LiDFOB), lithium dioxalate borate (LiBOB), lithium difluorophosphate ($LiPO_2F_2$), lithium difluorodioxalate phosphate (LiDFOP) and lithium tetrafluorooxalate phosphate (LiTFOP).

The type of solvent is not specifically restricted in the present application, and can be selected by those skilled in the art according to actual requirements. In some embodiments, the solvent may comprise, as an example, at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the electrolytic solution may also optionally include additives. For example, the additives may include negative electrode film-forming additives, and may include positive electrode film-forming additives, and yet may include additives that can improve certain performances of battery, for example, additives that improve battery overcharge performance, additives that improve high-temperature performance of battery, and additives that improve low-temperature performance of battery.

[Separator]

In the secondary batteries using an electrolytic solution and some secondary batteries using a solid electrolyte, separators may be further included. The separators are arranged between the positive electrode plate and the negative electrode plate, and mainly function as preventing short circuit of the positive and negative electrodes while allowing active ions to pass through. There is no particular limitation on the type of separator in the present application, and any well-known porous-structure separator with good chemical stability and mechanical stability may be used.

In some embodiments, materials of the separator may be at least one of glass fibers, non-woven fabrics, polyethylene, polypropylene and polyvinylidene fluoride. The separator may be a single-layer film or a multi-layer composite film. When the separator is a multi-layer composite film, materials of each layer may be the same or different.

In some embodiments, the positive electrode plate, the separator, and the negative electrode plate may be made into an electrode assembly by a winding process or a laminating process.

In some embodiments, the secondary battery may include an outer package. The outer package may be used to encapsulate the electrode assembly and electrolyte.

In some embodiments, the outer package of the secondary battery may be a hard case, such as a hard plastic case, an aluminum case, a steel case, and the like. The outer package of the secondary battery may also be a soft package, such as a pouch-type soft package. A material of the soft bag can be plastic, such as at least one of polypropylene (PP), polybutylene terephthalate (PBT), and polybutylene succinate (PBS).

The shape of the secondary battery is not particularly limited in the present application, and it may be cylindrical, square, rectangular or any other shape. FIG. 1 is a schematic diagram of a secondary battery 5 of a rectangular structure as an example.

Figure 2:
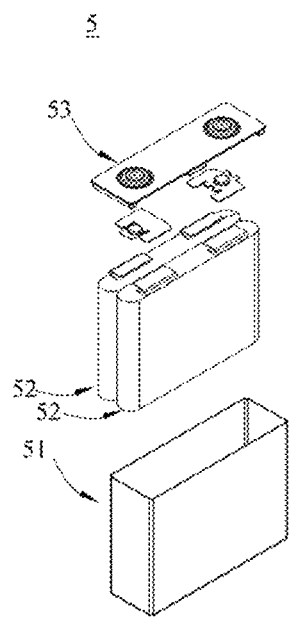
FIG. 2 is an exploded view of a secondary battery according to the embodiment of the present application as shown in FIG. 1.

In some embodiments, as shown in FIG. 2, the outer package may include a casing 51 and a cover plate 53, wherein the casing 51 may include a bottom plate and side plates connected to the bottom plate, and the bottom plate and the side plates are enclosed to form an accommodating cavity. The casing 51 has an opening communicating with the accommodating cavity, and the cover plate 53 is used to cover the opening to close the accommodating cavity. A positive electrode plate, a separator, and a negative electrode plate may be made into an electrode assembly 52 by a winding process or a laminating process. The electrode assembly 52 is packaged in the accommodating cavity, and the electrolytic solution is infiltrated in the electrode assembly 52. The number of electrode assemblies 52 contained in the secondary battery 5 may be one or several, and may be adjusted according to requirements.

A process for preparing the secondary battery of the present application is well known in the art. In some embodiments, a positive electrode plate, a separator, a negative electrode plate and an electrolytic solution may be assembled into a secondary battery. As an example, a positive electrode plate, a separator, and a negative electrode plate can be made into an electrode assembly by a winding process or a laminating process, and the electrode assembly can be placed in an outer package and is subjected to drying, to which an electrolytic solution is injected. After vacuum encapsulation, resting, chemical formation, and shaping process, a secondary battery can be obtained.

In some embodiments of the present application, the secondary batteries according to the present application can be assembled into a battery module, and the number of secondary batteries contained in the battery module can be more than one, and the specific number can be adjusted according to application and capacity of the battery module.

Figure 3:
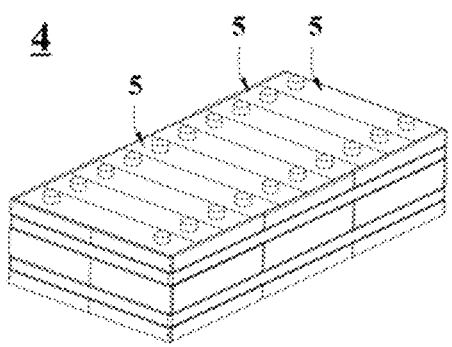
FIG. 3 is a schematic diagram of a battery module according to an embodiment of the present application.

FIG. 3 is a schematic diagram of the battery module 4 as an example. As shown in FIG. 3, in the battery module 4, a plurality of secondary batteries 5 may be arranged in sequence along the longitudinal direction of the battery module 4. Certainly, they can also be arranged in any other manner. Furthermore, a plurality of secondary batteries 5 can be fixed with fasteners.

Optionally, the battery module 4 may further include a housing having an accommodating space in which a plurality of secondary batteries 5 are accommodated.

In some embodiments, the above-mentioned battery modules can also be assembled into a battery pack, and the number of battery modules included in the battery pack can be adjusted according to the application and capacity of the battery pack.

Figure 4:
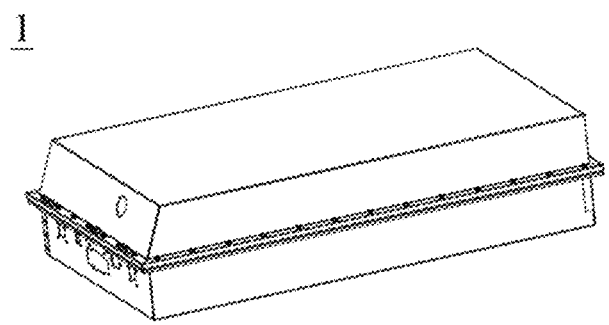
FIG. 4 is a schematic diagram of a battery pack according to an embodiment of the present application.
Figure 5:
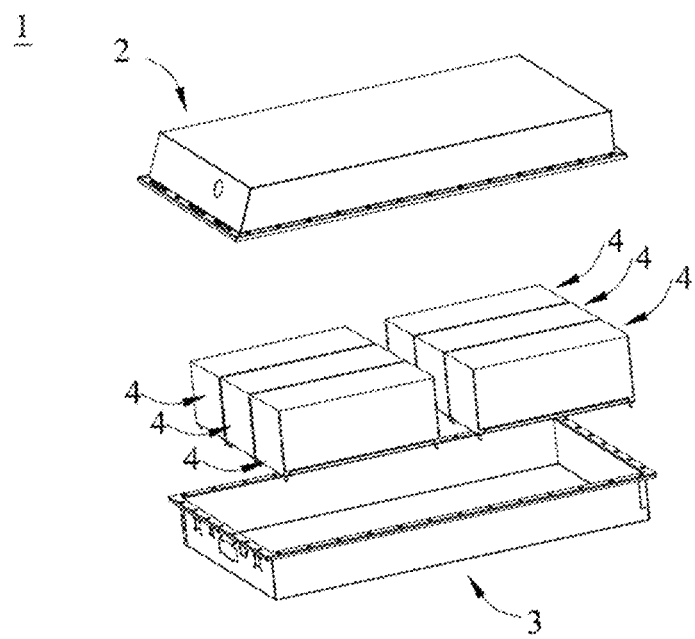
FIG. 5 is an exploded view of the battery pack according to the embodiment of the present application as shown in FIG. 4.

FIGS. 4 and 5 are schematic diagrams of the battery pack 1 as an example. As shown in FIGS. 4 and 5, the battery pack 1 may include a battery case and a plurality of battery modules 4 provided in the battery case. The battery box includes an upper case body 2 and a lower case body 3, and the upper case body 2 is used to cover the lower case body 3 to form a closed space for accommodating the battery modules 4. A plurality of battery modules 4 may be arranged in the battery case in any manner.

Electrical Device

A fifth aspect of the present application provides an electrical device comprising at least one of the secondary battery, battery module, and battery pack of the present application. The secondary battery, battery module or battery pack can be used as a power source of the electrical device, and can also be used as an energy storage unit of the electrical device. The electrical device can be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The electrical device can select a secondary battery, a battery module or a battery pack according to its usage requirements.

Figure 6:
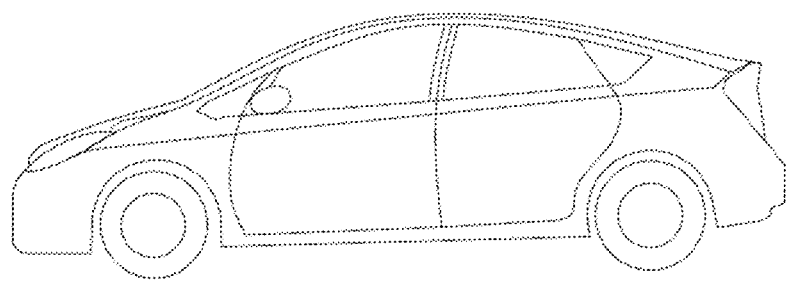
FIG. 6 is a schematic diagram of an electrical device according to an embodiment of the present application using the secondary battery of the present application as power.

FIG. 6 is a schematic diagrams of an electrical device as an example. The electrical device is a pure electric vehicle, a hybrid electric vehicle, or a plug-in hybrid electric vehicle. In order to meet high power and high energy density requirements of the electrical device, a battery pack or a battery module can be used.

As another example, the electrical device may be a mobile phone, a tablet computer, a notebook computer, and the like. The electric device is generally required to be light and thin, and a secondary battery can be used as a power source.

EXAMPLES

The following examples more specifically describe the content disclosed in the present application, and these examples are only used for explanatory description, because various modifications and changes within the scope of the present disclosure are apparent to those skilled in the art. Unless otherwise stated, all parts, percentages, and ratios described in the following examples are based on weight, and all reagents used in the examples are commercially available or synthesized according to conventional methods and can be directly used without further treatment, and all instruments used in the examples are commercially available.

Example 1

1) Preparation of Positive Electrode Active Material

Preparation of doped manganese oxalate: 1.3 mol of $MnSO_4 \cdot H_2O$ and 0.7 mol of $FeSO_4 \cdot H_2O$ were mixed thoroughly in a mixer for 6 hours. The mixture was transferred to a reaction kettle and 10 L of deionized water and 2 mol of oxalic acid dihydrate (as oxalic acid) were added. The reaction kettle was heated to 80° C. and stirred at 600 rpm for 6 h. The reaction was terminated (no bubbles were generated) to obtain a suspension of Fe doped manganese oxalate. Then the suspension was filtered and the resulting filter cake was dried at 120° C., after which it was ground to obtain particles of Fe doped manganese oxalate with a median particle size $Dv_{50}$ of about 100 nm.

Preparation of core: 1 mol of the above particles of manganese oxalate, 0.497 mol of lithium carbonate, 0.001 mol of $Mo(SO_4)_3$, aqueous phosphoric acid solution containing 0.999 mol of phosphoric acid at a concentration of 85%, 0.001 mol of $H_4SiO_4$ and 0.0005 mol of $NH_4HF_2$ were added to 20 L of deionized water. The mixture was transferred to a sanding mill and well ground and stirred for 10 hours to obtain a slurry. The slurry was transferred to a spray drying equipment for spray drying granulation, with a drying temperature of 250° C. for 4 hours to obtain granules. The above powder was sintered at 700° C. for 10 hours in a protective atmosphere of nitrogen (90 vol %)+ hydrogen (10 vol %) to obtain $Li_{0.994}Mo_{0.001}Mn_{0.65}Fe_{0.35}P_{0.999}Si_{0.001}O_{3.999}F_{0.001}$, i.e. the core. The content of elements can be detected by inductively coupled plasma emission spectroscopy (ICP).

Coating of a first cladding layer: Polyvinylidene fluoride was dissolved in N-methylpyrrolidone to form a first cladding solution, and then the prepared core was added to the cladding solution with stirring well to form a mixed slurry, and then the mixed slurry was placed in a wet cladding equipment and dried in a nitrogen atmosphere at 120° C. for 4 hours to obtain the core material covered by the first cladding layer. The polyvinylidene fluoride has an electron withdrawing group (—F) in a mass percentage of 59.3% and a number average molecular weight of 160,000, and the coating amount was 1.5 wt %, based on the weight of the core.

Coating of a second cladding layer: carboxymethyl chitosan was dissolved in deionized water to form a cladding solution, and then the core material covered by the first cladding layer was added therein and stirred uniformly to form a mixed slurry, and then the mixed slurry was placed in a wet packer and dried in a nitrogen atmosphere at 120° C. for 4 hours, to obtain the positive electrode active material. The mass percentage of substituents attached to the sugar unit in the carboxymethyl chitosan was 59.9%, the number average molecular weight thereof is 22,000, and the coating amount was 1 wt %, based on the weight of the core.

2) Preparation of Button Battery

The above positive electrode active material, polyvinylidene difluoride (PVDF), and acetylene black in a weight ratio of 90:5:5 were added to N-methylpyrrolidone (NMP) and stirred in a drying room to make a slurry. The above slurry was applied to an aluminum foil, dried and cold pressed to form a positive electrode plate. The coating amount was $0.2$ g/cm$^2$ and the compaction density was $2.0$ g/cm$^3$.

Lithium plate was used as a negative electrode, a 1 mol/L solution of $LiPF_6$ in a 1:1:1 volume ratio of ethylene carbonate (EC), diethyl carbonate (DEC) and dimethyl carbonate (DMC) was used as an electrolytic solution, and they were assembled together with the above prepared positive electrode plate in a button battery box to form a button battery (hereinafter also referred to as "button").

3) Preparation of Full Battery

The above-mentioned positive electrode active material was mixed with acetylene black as a conductive agent and polyvinylidene difluoride (PVDF) as a binder in N-methylpyrrolidone as a solvent system in a weight ratio of 92:2.5:5.5 homogeneously to form a slurry. The above slurry was applied to aluminum foil and dried and cold pressed to obtain a positive electrode plate. The coating amount was $0.4$ g/cm$^2$ and the compaction density was $2.4$ g/cm$^3$.

An artificial graphite as a negative electrode active material, hard carbon, acetylene black as a conductive agent, butadiene rubber (SBR) as a binder, and sodium carboxymethyl cellulose (CMC) as a thickener were mixed in deionized water in a weight ratio of 90:5:2:2:1 to form a slurry, and then the slurry was applied to a copper foil and dried and cold pressed to obtain a negative electrode plate. The coating amount was 0.2 g/cm² and the compaction density was 1.7 g/cm³.

A porous polymer film of polyethylene (PE) was used as a separator. The positive electrode plate, separator and negative electrode plate were stacked in order, so that the separator was sandwiched between the positive and negative electrodes for isolation, and then they were wound to form an electrode assembly. The electrode assembly was placed in an outer package, filled with the same electrolytic solution as that in the above-mentioned preparation of button battery, and encapsulated to obtain a full battery.

Example 2

Example 2 was the same as Example 1, with the exception that in "1) Preparation of positive electrode active material", the amount of $Li_2CO_3$ was adjusted to 0.4885 mol, $Mo(SO_4)_3$ was replaced with $MgSO_4$, the amount of $FeSO_4·H_2O$ was adjusted to 0.68 mol, 0.02 mol of $Ti(SO_4)_2$ was added in the preparation of doped manganese oxalate, and $H_4SiO_4$ was replaced with $HNO_3$.

Example 3

Example 3 was the same as Example 1, with the exception that in "1) Preparation of positive electrode active material", the amount of $Li_2CO_3$ was adjusted to 0.496 mol, $Mo(SO_4)_3$ was replaced with $W(SO_4)_3$, and $H_4SiO_4$ was replaced with $H_2SO_4$.

Example 4

Example 4 was the same as Example 1, with the exception that in "1) Preparation of positive electrode active material", the amount of $Li_2CO_3$ was adjusted to 0.4985 mol, 0.001 mol of $Mo(SO_4)_3$ was replaced with 0.0005 mol of $Al_2(SO_4)_3$, and $NH_4HF_2$ was replaced with $NH_4HCl_2$.

Example 5

Example 5 was the same as Example 1, with the exception that in "1) Preparation of positive electrode active material", the amount of $FeSO_4·H_2O$ was adjusted to 0.69 mol, 0.01 mol of $VCl_2$ was added in the preparation of doped manganese oxalate, the amount of $Li_2CO_3$ was adjusted to 0.4965 mol, 0.001 mol of $Mo(SO_4)_3$ was replaced with 0.0005 mol of $Nb_2(SO_4)_5$ and $H_4SiO_4$ was replaced with $H_2SO_4$.

Example 6

Example 6 was the same as Example 1, with the exception that in "1) Preparation of positive electrode active material", the amount of $FeSO_4·H_2O$ was adjusted to 0.68 mol, 0.01 mol of $VCl_2$ and 0.01 mol of $MgSO_4$ were added in the preparation of doped manganese oxalate, the amount of $Li_2CO_3$ was adjusted to 0.4965 mol, 0.001 mol of $Mo(SO_4)_3$ was replaced with 0.0005 mol of $Nb_2(SO_4)_5$ and $H_4SiO_4$ was replaced with $H_2SO_4$.

Example 7

Example 7 was the same as Example 6, with the exception that in "1) Preparation of positive electrode active material", $MgSO_4$ was replaced with $CoSO_4$.

Example 8

Example 8 was the same as Example 6, with the exception that in "1) Preparation of positive electrode active material", $MgSO_4$ was replaced with $NiSO_4$.

Example 9

Example 9 was the same as Example 1, with the exception that in "1) Preparation of positive electrode active material", the amount of $FeSO_4·H_2O$ was adjusted to 0.698 mol, 0.002 mol of $Ti(SO_4)_2$ was added in the preparation of doped manganese oxalate, the amount of $Li_2CO_3$ was adjusted to 0.4955 mol, and 0.001 mol of $Mo(SO_4)_3$ was replaced with 0.0005 mol of $Nb_2(SO_4)_5$, $H_4SiO_4$ was replaced with $H_2SO_4$, and $NH_4HF_2$ was replaced with $NH_4HCl_2$.

Example 10

Example 10 was the same as Example 1, with the exception that in "1) Preparation of positive electrode active material", the amount of $FeSO_4·H_2O$ was adjusted to 0.68 mol, 0.01 mol of $VCl_2$ and 0.01 mol of $MgSO_4$ were added in the preparation of doped manganese oxalate, the amount of $Li_2CO_3$ was adjusted to 0.4975 mol, 0.001 mol of $Mo(SO_4)_3$ was replaced with 0.0005 mol of $Nb_2(SO_4)_5$, and $NH_4HF_2$ was replaced with $NH_4HBr_2$.

Example 11

Example 11 was the same as Example 1, with the exception that in "1) Preparation of positive electrode active material", the amount of $FeSO_4·H_2O$ was adjusted to 0.69 mol, 0.01 mol of $VCl_2$ was added in the preparation of doped manganese oxalate, the amount of $Li_2CO_3$ was adjusted to 0.499 mol, $Mo(SO_4)_3$ was replaced with $MgSO_4$, and $NH_4HF_2$ was replaced with $NH_4HBr_2$.

Example 12

Example 12 was the same as Example 1, with the exception that in "1) Preparation of positive electrode active material", the amount of $MnSO_4·H_2O$ was adjusted to 1.36 mol, the amount of $FeSO_4·H_2O$ was adjusted to 0.6 mol, 0.04 mol of $VCl_2$ was added in the preparation of doped manganese oxalate, the amount of $Li_2CO_3$ was adjusted to 0.4985 mol, and $Mo(SO_4)_3$ was replaced with $MgSO_4$, and $H_4SiO_4$ was replaced with $HNO_3$.

Example 13

Example 13 was the same as Example 12, with the exception that in "1) Preparation of positive electrode active material", the amount of $MnSO_4·H_2O$ was adjusted to 1.16 mol, and the amount of $FeSO_4·H_2O$ was adjusted to 0.8 mol.

Example 14

Example 14 was the same as Example 12, with the exception that in "1) Preparation of positive electrode active material", the amount of $MnSO_4·H_2O$ was adjusted to 1.3 mol, and the amount of $VCl_2$ was adjusted to 0.1 mol.

Example 15

Example 15 was the same as Example 1, with the exception that in "1) Preparation of positive electrode active material", the amount of MnSO$_4$·H$_2$O was adjusted to 1.2 mol, 0.1 mol of VCl$_2$ was added in the preparation of doped manganese oxalate, the amount of Li$_2$CO$_3$ was adjusted to 0.494 mol, and 0.001 mol of Mo(SO$_4$)$_3$ was replaced with 0.005 mol of MgSO$_4$, and H$_4$SiO$_4$ was replaced with H$_2$SO$_4$.

Example 16

Example 16 was the same as Example 1, with the exception that in "1) Preparation of positive electrode active material", the amount of MnSO$_4$·H$_2$O was adjusted to 1.2 mol, 0.1 mol of VCl$_2$ was added in the preparation of doped manganese oxalate, the amount of Li$_2$CO$_3$ was adjusted to 0.467 mol, and 0.001 mol of Mo(SO$_4$)$_3$ was replaced with 0.005 mol of MgSO$_4$, 0.001 mol of H$_4$SiO$_4$ was replaced with 0.005 mol of H$_2$SO$_4$ and 1.175 mol of phosphoric acid with a concentration of 85% was replaced with 1.171 mol of phosphoric acid with a concentration of 85%.

Example 17

Example 17 was the same as Example 1, with the exception that in "1) Preparation of positive electrode active material", the amount of MnSO$_4$·H$_2$O was adjusted to 1.2 mol, 0.1 mol of VCl$_2$ was added in the preparation of doped manganese oxalate, the amount of Li$_2$CO$_3$ was adjusted to 0.492 mol, and 0.001 mol of Mo(SO$_4$)$_3$ was replaced with 0.005 mol of MgSO$_4$, H$_4$SiO$_4$ was replaced with H$_2$SO$_4$ and the amount of NH$_4$HF$_2$ was adjusted to 0.0025 mol.

Example 18

Example 18 was the same as Example 1, with the exception that in "1) Preparation of positive electrode active material", the amount of FeSO$_4$·H$_2$O was adjusted to 0.5 mol, 0.1 mol of VCl$_2$ and 0.1 mol of CoSO$_4$ were added in the preparation of doped manganese oxalate, the amount of Li$_2$CO$_3$ was adjusted to 0.492 mol, and 0.001 mol of Mo(SO$_4$)$_3$ was replaced with 0.005 mol of MgSO$_4$, H$_4$SiO$_4$ was replaced with H$_2$SO$_4$ and the amount of NH$_4$HF$_2$ was adjusted to 0.0025 mol.

Example 19

Example 19 was the same as Example 18, with the exception that in "1) Preparation of positive electrode active material", the amount of FeSO$_4$·H$_2$O was adjusted to 0.4 mol, and the amount of CoSO$_4$ was adjusted to 0.2 mol.

Example 20

Example 20 was the same as Example 18, with the exception that in "1) Preparation of positive electrode active material", the amount of MnSO$_4$·H$_2$O was adjusted to 1.5 mol, the amount of FeSO$_4$·H$_2$O was adjusted to 0.1 mol, and the amount of CoSO$_4$ was adjusted to 0.3 mol.

Example 21

Example 21 was the same as Example 18, with the exception that in "1) Preparation of positive electrode active material", 0.1 mol of CoSO$_4$ was replaced with 0.1 mol of NiSO$_4$.

Example 22

Example 22 was the same as Example 18, with the exception that in "1) Preparation of positive electrode active material", the amount of MnSO$_4$·H$_2$O was adjusted to 1.5 mol, the amount of FeSO$_4$·H$_2$O was adjusted to 0.2 mol, and 0.1 mol of CoSO$_4$ was replaced with 0.2 mol of NiSO$_4$.

Example 23

Example 23 was the same as Example 18, with the exception that in "1) Preparation of positive electrode active material", the amount of MnSO$_4$·H$_2$O was adjusted to 1.4 mol, the amount of FeSO$_4$·H$_2$O was adjusted to 0.3 mol, and the amount of CoSO$_4$ was adjusted to 0.2 mol.

Example 24

Example 24 was the same as Example 1, with the exception that in "1) Preparation of positive electrode active material", the amount of MnSO$_4$·H$_2$O was adjusted to 1.2 mol, the amount of FeSO$_4$·H$_2$O was adjusted to 0.5 mol, 0.1 mol of VCl$_2$ and 0.2 mol of CoSO$_4$ were added in the preparation of doped manganese oxalate, the amount of Li$_2$CO$_3$ was adjusted to 0.497 mol, and 0.001 mol of Mo(SO$_4$)$_3$ was replaced with 0.005 mol of MgSO$_4$, H$_4$SiO$_4$ was replaced with H$_2$SO$_4$ and the amount of NH$_4$HF$_2$ was adjusted to 0.0025 mol.

Example 25

Example 25 was the same as Example 18, with the exception that in "1) Preparation of positive electrode active material", the amount of MnSO$_4$·H$_2$O was adjusted to 1.0 mol, the amount of FeSO$_4$·H$_2$O was adjusted to 0.7 mol, and the amount of CoSO$_4$ was adjusted to 0.2 mol.

Example 26

Example 26 was the same as Example 1, with the exception that in "1) Preparation of positive electrode active material", the amount of MnSO$_4$·H$_2$O was adjusted to 1.4 mol, the amount of FeSO$_4$·H$_2$O was adjusted to 0.3 mol, 0.1 mol of VCl$_2$ and 0.2 mol of CoSO$_4$ were added in the preparation of doped manganese oxalate, the amount of Li$_2$CO$_3$ was adjusted to 0.4825 mol, and 0.001 mol of Mo(SO$_4$)$_3$ was replaced with 0.005 mol of MgSO$_4$, the amount of H$_4$SiO$_4$ was adjusted to 0.1 mol, the amount of phosphoric acid was adjusted to 0.9 mol and the amount of NH$_4$HF$_2$ was adjusted to 0.04 mol.

Example 27

Example 27 was the same as Example 1, with the exception that in "1) Preparation of positive electrode active material", the amount of MnSO$_4$·H$_2$O was adjusted to 1.4 mol, the amount of FeSO$_4$·H$_2$O was adjusted to 0.3 mol, 0.1 mol of VCl$_2$ and 0.2 mol of CoSO$_4$ were added in the preparation of doped manganese oxalate, the amount of Li$_2$CO$_3$ was adjusted to 0.485 mol, and 0.001 mol of Mo(SO$_4$)$_3$ was replaced with 0.005 mol of MgSO$_4$, the amount of H$_4$SiO$_4$ was adjusted to 0.08 mol, the amount of phosphoric acid was adjusted to 0.92 mol and the amount of NH$_4$HF$_2$ was adjusted to 0.05 mol.

Comparative Example 1

Preparation of manganese oxalate: 1 mol of MnSO$_4$·H$_2$O was added to a reaction kettle and 10 L of deionized water and 1 mol of oxalic acid dihydrate (as oxalic acid) were added. The reaction kettle was heated to 80° C. and stirred at 600 rpm for 6 h. The reaction was terminated (no bubbles were generated) to obtain a suspension of manganese oxalate. Then the suspension was filtered and the resulting filter cake was dried at 120° C., after which it was ground to obtain particles of manganese oxalate with a median particle size $Dv_{50}$ of 50-200 nm.

Preparation of lithium manganese phosphate: 1 mol of the above particles of manganese oxalate, 0.5 mol of lithium carbonate, and aqueous phosphoric acid solution containing 1 mol phosphoric acid at a concentration of 85% were added to 20 L of deionized water. The mixture was transferred to a sanding mill and well ground and stirred for 10 hours to obtain a slurry. The slurry was transferred to a spray drying equipment for spray drying granulation, with a drying temperature of 250° C. for 4 hours to obtain granules. The above powder was sintered at 700° C. for 10 hours in a protective atmosphere of nitrogen (90 vol %)+hydrogen (10 vol %) to obtain $LiMnPO_4$.

Comparative Example 2

Comparative Example 2 was the same as Comparative Example 1, with the exception that 1 mol of $MnSO_4 \cdot H_2O$ was replaced with 0.85 mol of $MnSO_4 \cdot H_2O$ and 0.15 mol of $FeSO_4 \cdot H_2O$, and $MnSO_4 \cdot H_2O$ and $FeSO_4 \cdot H_2O$ were mixed thoroughly in a mixer for 6 hours and then transferred to a reaction kettle.

Comparative Example 3

Comparative Example 3 was the same as Example 1, with the exception that in "1) Preparation of positive electrode active material", a first cladding layer and a second cladding layer were not applied on the surface of the prepared core, the amount of $MnSO_4 \cdot H_2O$ was adjusted to 1.9 mol, 0.7 mol of $FeSO_4 \cdot H_2O$ was replaced with 0.1 mol of $ZnSO_4$, the amount of $Li_2CO_3$ was adjusted to 0.495 mol, 0.001 mol of $Mo(SO_4)_3$ was replaced with 0.005 mol of $MgSO_4$, the amount of phosphoric acid was adjusted to 1 mol, and neither $H_4SiO_4$ nor $NH_4HF_2$ was added.

Comparative Example 4

Comparative Example 4 was the same as Example 1, with the exception that in "1) Preparation of positive electrode active material", a first cladding layer and a second cladding layer were not applied on the surface of the prepared core, the amount of $MnSO_4 \cdot H_2O$ was adjusted to 1.2 mol, the amount of $FeSO_4 \cdot H_2O$ was adjusted to 0.8 mol, the amount of $Li_2CO_3$ was adjusted to 0.45 mol, 0.001 mol of $Mo(SO_4)_3$ was replaced with 0.005 mol of $Nb_2(SO_4)_5$, the amount of phosphoric acid was adjusted to 1 mol, the amount of $NH_4HF_2$ was adjusted to 0.025 mol and no $H_4SiO_4$ was added.

Comparative Example 5

Comparative Example 5 was the same as Example 1, with the exception that in "1) Preparation of positive electrode active material", a first cladding layer and a second cladding layer were not applied on the surface of the prepared core, the amount of $MnSO_4 \cdot H_2O$ was adjusted to 1.4 mol, the amount of $FeSO_4 \cdot H_2O$ was adjusted to 0.6 mol, the amount of $Li_2CO_3$ was adjusted to 0.38 mol, and 0.001 mol of $Mo(SO_4)_3$ was replaced with 0.12 mol of $MgSO_4$.

Comparative Example 6

Comparative Example 6 was the same as Example 1, with the exception that in "1) Preparation of positive electrode active material", a first cladding layer and a second cladding layer were not applied on the surface of the prepared core, the amount of $MnSO_4 \cdot H_2O$ was adjusted to 0.8 mol, 0.7 mol of $FeSO_4 \cdot H_2O$ was replaced with 1.2 mol of $ZnSO_4$, the amount of $Li_2CO_3$ was adjusted to 0.499 mol, and 0.001 mol of $Mo(SO_4)_3$ was replaced with 0.001 mol of $MgSO_4$.

Comparative Example 7

Comparative Example 7 was the same as Example 1, with the exception that in "1) Preparation of positive electrode active material", a first cladding layer and a second cladding layer were not applied on the surface of the prepared core, the amount of $MnSO_4 \cdot H_2O$ was adjusted to 1.4 mol, the amount of $FeSO_4 \cdot H_2O$ was adjusted to 0.6 mol, the amount of $Li_2CO_3$ was adjusted to 0.534 mol, 0.001 mol of $Mo(SO_4)_3$ was replaced with 0.001 mol of $MgSO_4$, the amount of phosphoric acid was adjusted to 0.88 mol, the amount of $H_4SiO_4$ was adjusted to 0.12 mol, and the amount of $NH_4HF_2$ was adjusted to 0.025 mol.

Comparative Example 8

Comparative Example 8 was the same as Example 1, with the exception that in "1) Preparation of positive electrode active material", a first cladding layer and a second cladding layer were not applied on the surface of the prepared core, the amount of $MnSO_4 \cdot H_2O$ was adjusted to 1.2 mol, the amount of $FeSO_4 \cdot H_2O$ was adjusted to 0.8 mol, the amount of $Li_2CO_3$ was adjusted to 0.474 mol, 0.001 mol of $Mo(SO_4)_3$ was replaced with 0.001 mol of $MgSO_4$, the amount of phosphoric acid was adjusted to 0.93 mol, the amount of $H_4SiO_4$ was adjusted to 0.07 mol, and the amount of $NH_4HF_2$ was adjusted to 0.06 mol.

Comparative Example 9

Comparative Example 9 was the same as Example 1, with the exception that in "1) Preparation of positive electrode active material", a first cladding layer and a second cladding layer were not applied on the surface of the prepared core.

Test Methods for Performance of Positive Electrode Active Materials, Positive Electrode Plates, and Batteries 1. Measurement Method for Lattice Change Rate Under a constant temperature environment of 25° C., a positive electrode active material sample was placed in an X-ray diffractometer (Bruker D8 Discover model) and tested at 1°/minute. The test data was organized and analyzed. Referring to the standard PDF card, the lattice constants a0, b0, c0, and v0 (a0, b0, and c0 represent the length size in individual directions of lattice cell, respectively, v0 represents the volume of lattice cell, which can be directly obtained through XRD refinement results) were calculated.

Using the preparation method of button battery in the above Example, the positive electrode active material sample was prepared into a button battery. The button battery was charged at a small rate of 0.05 C until the current decreased to 0.01 C. Then the positive electrode plate was taken out the button battery and soaked in DMC for 8 hours. After drying and scraping the powder, the particles with a particle size less than 500 nm were screened out. A sample was taken and its lattice constant v1 was calculated in the same way as the fresh sample was tested above. (v0−v1)/v0×100% representing the lattice change rate of before and after complete de-intercalation and intercalation of lithium was shown in the table.

2. Measurement Method for Li/Mn Anti-Site Defect Concentration

The XRD results measured in the "Measurement method for lattice change rate" were compared with the PDF (Powder Diffusion File) card of standard crystal to obtain the Li/Mn anti-site defect concentration. Specifically, the XRD results tested in the "Measurement method for lattice change rate" were imported into the General Structural Analysis System (GSAS) software to automatically obtain refined results, which include the occupancy of different atoms. The Li/Mn anti-site defect concentration was obtained by reading the refined results.

3. Measurement Method for Surface Oxygen Valence 5 g of positive electrode active material sample was taken and prepared into a button battery according to the preparation method of button battery described in the above Example. The button battery was charged at a low rate of 0.05 C until the current decreased to 0.01 C. Then the positive electrode plate was taken out of the button battery and soaked in DMC for 8 hours. After drying and scraping the powder, the particles with a particle size less than 500 nm were screened out. The obtained particles were measured with Electron Energy Loss Spectroscopy (EELS, Talos F200S model) to obtain the energy loss near edge structure (ELNES), which can reflect the state density and energy level distribution of elements. Based on the density of states and energy level distribution, the number of occupied electrons was calculated by integrating the density of states in valence band, thereby calculating the surface oxygen valence after charging.

4. Measurement Method for Compaction Density 5 g of positive electrode active material sample powders were taken and placed in a special mold for compaction (CARVER mold in the United States, model 13 mm), and then the mold was placed on a compaction density instrument. 3T (tonne) of pressure was applied and the thickness of the powders under pressure was read on the equipment (the thickness after pressure relief, the area of the container used for testing being 1540.25 mm$^2$). The compaction density was calculated via $\rho=m/v$.

5. Measurement Method for Leaching Out of Mn (and Fe Doped at Mn Site) after Cycling At 45° C., a full battery with capacity reduced to 80% was discharged to 2.0 V of cutoff voltage at a rate of 0.1 C. Then the battery was disassembled, the negative electrode plate was taken out. 30 discs of unit areas (1540.25 mm$^2$) were randomly taken on the negative electrode plate. Inductively coupled plasma emission spectrum (ICP) was tested by using Agilent ICP-OES730. The amounts of Fe (if Fe was doped at Mn site of the positive electrode active material) and Mn were calculated on the basis of the ICP results, and then the amount of leaching out of Mn (and Fe doped at Mn site) after cycling was calculated. The testing standard was based on EPA-6010D-2014.

6. Measurement Method for Initial Specific Capacity of Button Battery

At a constant temperature of 25° C., a button battery was charged to 4.3V at 0.1 C, then charged at a constant voltage of 4.3V until the current was less than or equal to 0.05 mA, then rested for 5 minutes. Then the button battery was discharged at 0.1 C to 2.0V. The discharge capacity measured at this moment was initial specific capacity, denoted as D0.

7. Measurement Method for 3 C Charging Constant Current Ratio

Under a constant temperature environment of 25° C., a fresh full battery rested for 5 minutes and was discharged at a rate of 1/3 C to 2.5V, and rested for 5 minutes and was charged at 1/3 C to 4.3V, and then charged at a constant voltage at 4.3V until the current was less than or equal to 0.05 mA. The full battery rested for 5 minutes, then the charging capacity at this moment was reported as C0. The full battery was discharged at 1/3 C to 2.5V, rested for 5 minutes, then was charged at 3 C to 4.3V, rested for 5 minutes. The charging capacity at this moment was reported as C1. The 3 C charging constant current ratio was C1/C0× 100%.

The higher the 3 C charging constant current ratio, the better the rate performance of the battery.

8. Test of Cycle Performance at 45° C. of Full Battery

Under a constant temperature environment of 45° C., a full battery was charged at 1 C to 4.3V, and then charged at a constant voltage at 4.3V until the current was less than or equal to 0.05 mA. The full battery rested for 5 minutes, then discharged at 1 C to 2.5V. The discharging capacity at this moment was reported as E0. The above charging-discharging cycle was repeated until the discharging capacity was reduced to 80% of E0. The number of cycles the battery had undergone at this moment was reported.

9. Test of Gas Expansion at 60° C. of Full Battery

A full battery stored 100% state of charge (SOC) at 60° C. Before and during storage, the open circuit voltage (OCV) and AC internal impedance (IMP) of the battery were tested to monitor SOC and the volume of the battery was measured. After every 48 hours of storage, the full battery was taken out and rested for 1 hour, and then the open circuit voltage (OCV) and internal impedance (IMP) were tested. After cooling to room temperature, the volume of the battery was measured using the drainage method. The drainage method included measuring the gravity $F_1$ of the battery separately with a balance that can automatically perform unit conversion with the dial data, and then placing the battery completely in deionized water (with the density of 1 g/cm$^3$), measuring the gravity $F_2$ of the battery at this moment wherein the buoyant force $F_b$ of the battery was $F_1-F_2$, and then according to the Archimedes principle $F_b=\rho \times g \times V_{Drainage}$, the volume of battery was calculated: $V=(F_1-F_2)/(\rho \times g)$.

From the OCV and IMP test results, it can be seen that the batteries according to the examples maintain a SOC of 99% or higher throughout the testing process until the end of storage.

After 30 days of storage, the volume of battery was measured, and the percentage increase in battery volume after storage compared to the previous battery volume was calculated.

10. Determination of the Chemical Formula of Core and the Composition of Cladding Layer The internal microstructure and surface structure of the positive electrode active material were characterized with high spatial resolution by the spherical Aberration Corrected Scanning Transmission Electron Microscope (ACSTEM). By combining with the three-dimensional reconstruction technology, the chemical formula of the core and the composition of the cladding layer of the positive electrode active material were obtained.

Table 1 shown the composition of the positive electrode active material in Examples 1-11 and Comparative Examples 1-9. Table 2 shown the composition of the positive electrode active material in Examples 12-27. Table 3 shown the performance results measured by the above performance testing methods for the positive electrode active material, positive electrode plate, button battery or full battery of Examples 1-11 and Comparative Examples 1-9. Table 4 shown the performance results measured by the above performance testing methods for the positive electrode active material, positive electrode plate, button battery or full battery of Examples 12-27.

TABLE 1

| No. | Core | First cladding layer | Second cladding layer |
|---|---|---|---|
| Comparative Example 1 | $LiMnPO_4$ | — | — |
| Comparative Example 2 | $LiMn_{0.85}Fe_{0.15}PO_4$ | — | — |
| Comparative Example 3 | $Li_{0.990}Mg_{0.005}Mn_{0.95}Zn_{0.05}PO_4$ | — | — |
| Comparative Example 4 | $Li_{0.90}Nb_{0.01}Mn_{0.6}Fe_{0.4}PO_{3.95}F_{0.05}$ | — | — |
| Comparative Example 5 | $Li_{0.76}Mg_{0.12}Mn_{0.7}Fe_{0.3}P_{0.999}Si_{0.001}O_{3.999}F_{0.001}$ | — | — |
| Comparative Example 6 | $Li_{0.998}Mg_{0.001}Mn_{0.4}Zn_{0.6}P_{0.999}Si_{0.001}O_{3.999}F_{0.001}$ | — | — |
| Comparative Example 7 | $Li_{1.068}Mg_{0.001}Mn_{0.7}Fe_{0.3}P_{0.88}Si_{0.12}O_{3.95}F_{0.05}$ | — | — |
| Comparative Example 8 | $Li_{0.948}Mg_{0.001}Mn_{0.6}Fe_{0.4}P_{0.93}Si_{0.07}O_{3.88}F_{0.12}$ | — | — |
| Comparative Example 9 | $Li_{0.994}Mo_{0.001}Mn_{0.65}Fe_{0.35}P_{0.999}Si_{0.001}O_{3.999}F_{0.001}$ | — | — |
| Example 1 | $Li_{0.994}Mo_{0.001}Mn_{0.65}Fe_{0.35}P_{0.999}Si_{0.001}O_{3.999}F_{0.001}$ | 5% polyvinylidene fluoride | 1% carboxymethyl chitosan |
| Example 2 | $Li_{0.977}Mg_{0.001}Mn_{0.65}Fe_{0.34}Ti_{0.01}P_{0.999}N_{0.001}O_{3.999}F_{0.001}$ | 5% polyvinylidene fluoride | 1% carboxymethyl chitosan |
| Example 3 | $Li_{0.992}W_{0.001}Mn_{0.65}Fe_{0.35}P_{0.999}S_{0.001}O_{3.999}F_{0.001}$ | 5% polyvinylidene fluoride | 1% carboxymethyl chitosan |
| Example 4 | $Li_{0.997}Al_{0.001}Mn_{0.65}Fe_{0.35}P_{0.999}Si_{0.001}O_{3.999}Cl_{0.001}$ | 5% polyvinylidene fluoride | 1% carboxymethyl chitosan |
| Example 5 | $Li_{0.993}Nb_{0.001}Mn_{0.65}Fe_{0.345}V_{0.005}P_{0.999}S_{0.001}O_{3.999}F_{0.001}$ | 5% polyvinylidene fluoride | 1% carboxymethyl chitosan |
| Example 6 | $Li_{0.993}Nb_{0.001}Mn_{0.65}Fe_{0.34}V_{0.005}Mg_{0.005}P_{0.999}S_{0.001}O_{3.999}F_{0.001}$ | 5% polyvinylidene fluoride | 1% carboxymethyl chitosan |
| Example 7 | $Li_{0.993}Nb_{0.001}Mn_{0.65}Fe_{0.34}V_{0.005}Co_{0.005}P_{0.999}S_{0.001}O_{3.999}F_{0.001}$ | 5% polyvinylidene fluoride | 1% carboxymethyl chitosan |
| Example 8 | $Li_{0.993}Nb_{0.001}Mn_{0.65}Fe_{0.34}V_{0.005}Ni_{0.005}P_{0.999}S_{0.001}O_{3.999}F_{0.001}$ | 5% polyvinylidene fluoride | 1% carboxymethyl chitosan |
| Example 9 | $Li_{0.991}Nb_{0.001}Mn_{0.65}Fe_{0.349}Ti_{0.001}P_{0.999}S_{0.001}O_{3.999}Cl_{0.001}$ | 51% polyvinylidene fluoride | 1% carboxymethyl chitosan |
| Example 10 | $Li_{0.995}Nb_{0.001}Mn_{0.65}Fe_{0.34}V_{0.005}Mg_{0.005}P_{0.999}Si_{0.001}O_{3.999}Br_{0.001}$ | 5% polyvinylidene fluoride | 1% carboxymethyl chitosan |
| Example 11 | $Li_{0.998}Mg_{0.001}Mn_{0.65}Fe_{0.345}V_{0.005}P_{0.999}Si_{0.001}O_{3.999}Br_{0.001}$ | 5% polyvinylidene fluoride | 1% carboxymethyl chitosan |

TABLE 2

| No. | Core | (1-y):y | a:x | First cladding layer | Second cladding layer |
|---|---|---|---|---|---|
| Example 12 | $Li_{0.997}Mg_{0.001}Mn_{0.68}Fe_{0.3}V_{0.02}P_{0.999}N_{0.001}O_{3.999}F_{0.001}$ | 2.13 | 997 | 5% polyvinylidene fluoride | 1% carboxymethyl chitosan |
| Example 13 | $Li_{0.997}Mg_{0.001}Mn_{0.58}Fe_{0.4}V_{0.02}P_{0.999}N_{0.001}O_{3.999}F_{0.001}$ | 1.38 | 997 | 5% polyvinylidene fluoride | 1% carboxymethyl chitosan |
| Example 14 | $Li_{0.997}Mg_{0.001}Mn_{0.65}Fe_{0.3}V_{0.05}P_{0.999}N_{0.001}O_{3.999}F_{0.001}$ | 1.86 | 997 | 5% polyvinylidene fluoride | 1% carboxymethyl chitosan |
| Example 15 | $Li_{0.988}Mg_{0.005}Mn_{0.6}Fe_{0.35}V_{0.05}P_{0.999}S_{0.001}O_{3.999}F_{0.001}$ | 1.50 | 197.6 | 5% polyvinylidene fluoride | 1% carboxymethyl chitosan |

TABLE 2-continued

| No. | Core | (1-y):y | a:x | First cladding layer | Second cladding layer |
|---|---|---|---|---|---|
| Example 16 | $Li_{0.984}Mg_{0.005}Mn_{0.6}Fe_{0.35}V_{0.05}P_{0.995}S_{0.005}O_{3.999}F_{0.001}$ | 1.50 | 196.8 | 5% polyvinylidene fluoride | 1% carboxymethyl chitosan |
| Example 17 | $Li_{0.984}Mg_{0.005}Mn_{0.6}Fe_{0.35}V_{0.05}P_{0.999}S_{0.001}O_{3.995}F_{0.005}$ | 1.50 | 196.8 | 5% polyvinylidene fluoride | 1% carboxymethyl chitosan |
| Example 18 | $Li_{0.984}Mg_{0.005}Mn_{0.65}Fe_{0.25}V_{0.05}Co_{0.05}P_{0.999}S_{0.001}O_{3.995}F_{0.005}$ | 1.86 | 196.8 | 5% polyvinylidene fluoride | 1% carboxymethyl chitosan |
| Example 19 | $Li_{0.984}Mg_{0.005}Mn_{0.65}Fe_{0.20}V_{0.05}Co_{0.10}P_{0.999}S_{0.001}O_{3.995}F_{0.005}$ | 1.86 | 196.8 | 5% polyvinylidene fluoride | 1% carboxymethyl chitosan |
| Example 20 | $Li_{0.984}Mg_{0.005}Mn_{0.75}Fe_{0.05}V_{0.05}Co_{0.15}P_{0.999}S_{0.001}O_{3.995}F_{0.005}$ | 3.00 | 196.8 | 5% polyvinylidene fluoride | 1% carboxymethyl chitosan |
| Example 21 | $Li_{0.984}Mg_{0.005}Mn_{0.65}Fe_{0.25}V_{0.05}Ni_{0.05}P_{0.999}S_{0.001}O_{3.995}F_{0.005}$ | 1.86 | 196.8 | 5% polyvinylidene fluoride | 1% carboxymethyl chitosan |
| Example 22 | $Li_{0.984}Mg_{0.005}Mn_{0.75}Fe_{0.10}V_{0.05}Ni_{0.10}P_{0.999}S_{0.001}O_{3.995}F_{0.005}$ | 3.00 | 196.8 | 5% polyvinylidene fluoride | 1% carboxymethyl chitosan |
| Example 23 | $Li_{0.984}Mg_{0.005}Mn_{0.7}Fe_{0.15}V_{0.05}Co_{0.10}P_{0.999}S_{0.001}O_{3.995}F_{0.005}$ | 2.33 | 196.8 | 5% polyvinylidene fluoride | 1% carboxymethyl chitosan |
| Example 24 | $Li_{0.984}Mg_{0.005}Mn_{0.6}Fe_{0.25}V_{0.05}Co_{0.10}P_{0.999}S_{0.001}O_{3.995}F_{0.005}$ | 1.50 | 196.8 | 5% polyvinylidene fluoride | 1% carboxymethyl chitosan |
| Example 25 | $Li_{0.984}Mg_{0.005}Mn_{0.5}Fe_{0.35}V_{0.05}Co_{0.10}P_{0.999}S_{0.001}O_{3.995}F_{0.005}$ | 1.00 | 196.8 | 5% polyvinylidene fluoride | 1% carboxymethyl chitosan |
| Example 26 | $Li_{1.01}Mg_{0.005}Mn_{0.7}Fe_{0.15}V_{0.05}Co_{0.10}P_{0.9}Si_{0.1}O_{3.92}F_{0.08}$ | 2.33 | 202 | 5% polyvinylidene fluoride | 1% carboxymethyl chitosan |
| Example 27 | $Li_{0.97}Mg_{0.005}Mn_{0.7}Fe_{0.15}V_{0.05}Co_{0.10}P_{0.92}Si_{0.08}O_{3.9}F_{0.1}$ | 2.33 | 194 | 5% polyvinylidene fluoride | 1% carboxymethyl chitosan |

TABLE 3

| No. | Lattice change rate (%) | Li/Mn anti-site defect concentration (%) | Surface oxygen valence | Compaction density g/cm$^3$ | Leaching out of Mn and Fe after cycling (ppm) | Initial specific capacity of button battery mAh/g | 3 C charging constant current ratio (%) | Number of cycles at capacity retention of 80% @45° C. | Expansion rate of battery at 60° C. storage (%) |
|---|---|---|---|---|---|---|---|---|---|
| Comparative Example 1 | 11.4 | 5.2 | −1.55 | 1.6 | 2266 | 123.1 | 48.1 | 111 | 50.5 |
| Comparative Example 2 | 10.6 | 4.3 | −1.51 | 1.77 | 1661 | 123.9 | 48.4 | 119 | 38.8 |
| Comparative Example 3 | 10.8 | 3.6 | −1.64 | 1.78 | 1131 | 132.0 | 49.6 | 123 | 33.2 |
| Comparative Example 4 | 9.7 | 2.4 | −1.71 | 1.83 | 1078 | 138.5 | 59.8 | 136 | 32.0 |
| Comparative Example 5 | 5.6 | 1.8 | −1.81 | 1.88 | 960 | 108.6 | 48.2 | 356 | 22.3 |
| Comparative Example 6 | 3.7 | 1.5 | −1.8 | 1.91 | 631 | 72.8 | 63.2 | 431 | 16.4 |
| Comparative Example 7 | 7.8 | 1.5 | −1.75 | 1.95 | 492 | 136.6 | 61.7 | 364 | 19.0 |
| Comparative Example 8 | 8.4 | 1.4 | −1.79 | 2.06 | 289 | 138.9 | 61.3 | 374 | 23.6 |
| Comparative Example 9 | 6.3 | 1.2 | −1.82 | 2.11 | 211 | 153.6 | 65.7 | 508 | 8.7 |
| Example 1 | 6.3 | 1.2 | −1.82 | 2.13 | 60 | 153.8 | 65.8 | 810 | 8.4 |
| Example 2 | 6.8 | 1.1 | −1.85 | 2.15 | 52 | 150.6 | 72.1 | 799 | 7.5 |
| Example 3 | 6.4 | 0.9 | −1.86 | 2.21 | 49 | 151.8 | 73.6 | 860 | 8.6 |
| Example 4 | 5.5 | 0.9 | −1.89 | 2.28 | 45 | 150.7 | 75.3 | 841 | 8.3 |
| Example 5 | 5.3 | 0.7 | −1.98 | 2.35 | 41 | 151.0 | 83.2 | 981 | 7.8 |
| Example 6 | 2.4 | 0.7 | −1.95 | 2.37 | 39 | 154.7 | 89.1 | 952 | 6.4 |

TABLE 3-continued

| No. | Lattice change rate (%) | Li/Mn anti-site defect concentration (%) | Surface oxygen valence | Compaction density g/cm³ | Leaching out of Mn and Fe after cycling (ppm) | Initial specific capacity of button battery mAh/g | 3 C charging constant current ratio (%) | Number of cycles at capacity retention of 80% @45° C. | Expansion rate of battery at 60° C. storage (%) |
|---|---|---|---|---|---|---|---|---|---|
| Example 7 | 2.2 | 0.6 | −1.96 | 2.39 | 37 | 156.5 | 92.1 | 1051 | 6.3 |
| Example 8 | 3.4 | 0.5 | −1.98 | 2.41 | 34 | 154.6 | 90.0 | 930 | 6.2 |
| Example 9 | 3.8 | 0.5 | −1.96 | 2.35 | 38 | 144.2 | 86.7 | 900 | 6.8 |
| Example 10 | 4 | 0.6 | −1.97 | 2.36 | 43 | 152.7 | 89.6 | 850 | 6.5 |
| Example 11 | 3.6 | 0.7 | −1.95 | 2.36 | 52 | 153.0 | 89.9 | 800 | 6.4 |

TABLE 4

| No. | Lattice change rate (%) | Li/Mn anti-site defect concentration (%) | Surface oxygen valence | Compaction density g/cm³ | Leaching out of Mn and Fe after cycling (ppm) | Initial specific capacity of button battery mAh/g | 3 C charging constant current ratio (%) | Number of cycles at capacity retention of 80% @45° C. | Expansion rate of battery at 60° C. storage (%) |
|---|---|---|---|---|---|---|---|---|---|
| Example 12 | 7.4 | 0.5 | −1.96 | 2.33 | 42 | 150.5 | 95.1 | 1110 | 6.7 |
| Example 13 | 7.6 | 0.4 | −1.98 | 2.36 | 40 | 155.2 | 81.7 | 1123 | 7.8 |
| Example 14 | 7.8 | 0.6 | −1.95 | 2.34 | 38 | 152.5 | 81.8 | 1227 | 6.9 |
| Example 15 | 6.4 | 0.5 | −1.97 | 2.35 | 35 | 153.6 | 78.8 | 1100 | 7.5 |
| Example 16 | 5.4 | 0.7 | −1.94 | 2.32 | 38 | 153.3 | 83.8 | 1079 | 8.4 |
| Example 17 | 4.2 | 0.6 | −1.98 | 2.31 | 34 | 153.7 | 90.3 | 1080 | 7.5 |
| Example 18 | 2.5 | 0.4 | −1.96 | 2.34 | 37 | 155.2 | 91.8 | 1220 | 6.4 |
| Example 19 | 2.4 | 0.4 | −1.97 | 2.35 | 39 | 154.1 | 92.1 | 1230 | 6.7 |
| Example 20 | 2.6 | 0.4 | −1.95 | 2.32 | 33 | 152.0 | 91.6 | 1110 | 7.3 |
| Example 21 | 3.3 | 0.5 | −1.93 | 2.36 | 36 | 152.8 | 89.9 | 1123 | 6.3 |
| Example 22 | 3.1 | 0.5 | −1.95 | 2.34 | 39 | 155.5 | 89.5 | 1081 | 6.3 |
| Example 23 | 2.8 | 0.6 | −1.96 | 2.32 | 40 | 149.1 | 81.0 | 1019 | 5.9 |
| Example 24 | 2.5 | 0.5 | −1.97 | 2.33 | 35 | 149.6 | 86.6 | 1130 | 5.6 |
| Example 25 | 2.2 | 0.4 | −1.98 | 2.35 | 33 | 150.5 | 90.1 | 1138 | 5.2 |
| Example 26 | 3.4 | 0.6 | −1.95 | 2.14 | 31 | 144.6 | 90.3 | 1115 | 9.3 |
| Example 27 | 2.7 | 0.5 | −1.98 | 2.17 | 27 | 143.2 | 89.1 | 1062 | 10.5 |

From Table 3 and Table 4 above, it can be seen that better performance have been achieved by using the positive electrode active materials of Examples of this application than Comparative Example, in one or all aspects of cycling performance, high-temperature stability, specific capacity, and compaction density. By simultaneously doping specific elements at the Li, Mn, P, and O sites of $LiMnPO_4$ with specific amounts, improved rate performance can be achieved while reducing the leaching out of Mn and Fe, resulting in improved cycling performance and/or high-temperature stability. Additionally, the specific capacity and compaction density of the positive electrode active material can also be increased. The presence of a first cladding layer and a second cladding layer can significantly reduce the leaching out of Mn and Fe, further alleviate the corrosion of the acid in the electrolyte on the surface of the positive electrode active material, and significantly improve the cycling performance and/or high-temperature stability of the battery.

From the comparison between Examples 18-20 and 23-25, it can be seen that with the same other elements, (1−y):y in the range of 1 to 4 can further improve the energy density and cycling performance of the secondary battery.

Figure 7:
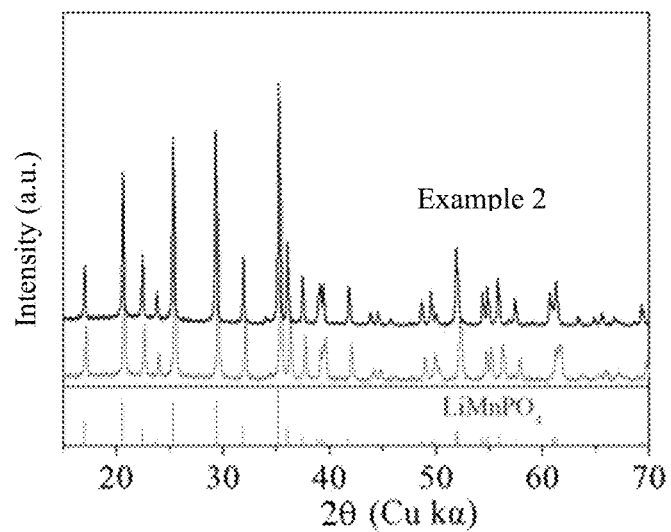
FIG. 7 illustrates an X-ray diffraction (XRD) of the undoped $LiMnPO_4$ and the core of the positive electrode active material prepared in Example 2.
Figure 8:
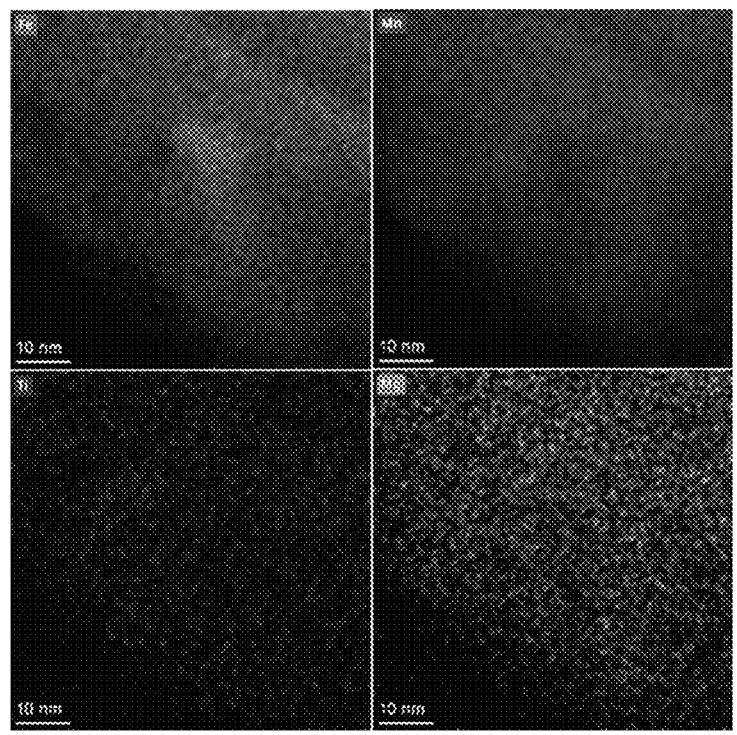
FIG. 8 illustrates an X-ray energy dispersive spectroscopy (EDS) of the core of the positive electrode active material prepared in Example 2.

FIG. 7 shown the X-ray diffraction pattern (XRD) of the undoped $LiMnPO_4$ and the core of the positive electrode active material prepared in Example 2. It can be seen from FIG. 7 that the main characteristic peak positions in the XRD spectrum of the core of the positive electrode active material in Example 2 are consistent with those of the undoped $LiMnPO_4$, indicating that no impurity phase is introduced during the doping process, and the improvement in performance is mainly caused by doping of elements rather than by impurity phase. FIG. 8 shown the X-ray energy dispersive spectrum (EDS) of the core of the positive electrode active material prepared in Example 2. The dotted distribution in FIG. 8 represents individual doped elements. It can be seen from FIG. 8 that the element doping in the core of the positive electrode active material in Example 2 is uniform.

The inventors next examined the effect of the cladding layer on the performance of the positive electrode active material and the performance of the secondary battery.

Examples 28-51 were carried out in a similar manner as Example 1, with differences described in Table 5 below. Examples 52-60 were carried out in a similar manner as Example 1, with differences described in Table 6 below. Table 7 illustrated the performance data of the positive electrode active material, positive electrode plate, button battery or full battery of Examples 28-51 as measured in accordance with the test methods described above. Table 8 illustrated the performance data of the positive electrode active material, positive electrode plate, button battery or full battery of Examples 52-60 as measured in accordance with the test methods described above.

TABLE 5

| No. | First polymer | First cladding layer Amount α of functional group | Number average molecular weight | Coating amount W1 | Second polymer | Second cladding layer Amount β of functional group | Number average molecular weight | Coating amount W2 |
|---|---|---|---|---|---|---|---|---|
| Example 1 | Polyvinylidene fluoride | 59.3% | 160000 | 1.5% | Carboxymethyl chitosan | 59.9% | 22000 | 1.0% |
| Example 28 | Polyacrylonitrile | 49.0% | 150000 | 1.5% | Hydroxyethyl Cellulose | 45.9% | 59800 | 1.0% |
| Example 29 | Polyacrylic acid | 62.5% | 100000 | 1.5% | Carboxymethyl cellulose | 53.3% | 90000 | 1.0% |
| Example 30 | Polymethyl methacrylate | 44.0% | 88500 | 1.5% | Hydroxypropyl Starch | 40.8% | 47300 | 1.0% |
| Example 31 | Nitrile rubber | 30.2% | 68000 | 1.5% | Sodium Alginate | 44.0% | 18000 | 1.0% |
| Example 32 | Polyacrylamide | 61.9% | 120000 | 1.5% | Fucoidan | 42.4% | 23000 | 1.0% |
| Example 33 | Mercaptan resin | 22.0% | 125000 | 1.5% | Agar | 39.0% | 26800 | 1.0% |
| Example 34 | Polystyrene phosphorous acid | 38.9% | 257000 | 1.5% | Carrageenan | 62.3% | 32000 | 1.0% |
| Example 35 | Mercaptan resin | 20.0% | 156000 | 1.5% | Carboxymethyl chitosan | 60.2% | 26000 | 1.0% |
| Example 36 | Polycyanoacrylic acid | 75.0% | 273000 | 1.5% | Carboxymethyl chitosan | 60.2% | 26000 | 1.0% |
| Example 37 | Polyvinylidene fluoride | 59.3% | 180000 | 1.5% | Carboxymethyl chitosan | 15.0% | 112000 | 1.0% |
| Example 38 | Polyvinylidene fluoride | 59.3% | 180000 | 1.5% | Carboxymethyl chitosan | 90.0% | 76400 | 1.0% |
| Example 39 | Polyacrylic acid | 62.5% | 10000 | 1.5% | Carboxymethyl chitosan | 59.9% | 22000 | 1.0% |
| Example 40 | Polyacrylic acid | 62.5% | 15000 | 1.5% | Carboxymethyl chitosan | 59.9% | 22000 | 1.0% |
| Example 41 | Polyacrylic acid | 62.5% | 50000 | 1.5% | Carboxymethyl chitosan | 59.9% | 22000 | 1.0% |
| Example 42 | Polyacrylic acid | 62.5% | 100000 | 1.5% | Carboxymethyl chitosan | 59.9% | 22000 | 1.0% |
| Example 43 | Polyacrylic acid | 62.5% | 250000 | 1.5% | Carboxymethyl chitosan | 59.9% | 22000 | 1.0% |
| Example 44 | Polyacrylic acid | 62.5% | 300000 | 1.5% | Carboxymethyl chitosan | 59.9% | 22000 | 1.0% |
| Example 45 | Polyacrylic acid | 62.5% | 350000 | 1.5% | Carboxymethyl chitosan | 59.9% | 22000 | 1.0% |
| Example 46 | Polyvinylidene fluoride | 59.3% | 160000 | 1.5% | Carboxymethyl chitosan | 61.3% | 10000 | 1.0% |
| Example 47 | Polyvinylidene fluoride | 59.3% | 160000 | 1.5% | Carboxymethyl chitosan | 60.8% | 15000 | 1.0% |
| Example 48 | Polyvinylidene fluoride | 59.3% | 160000 | 1.5% | Carboxymethyl chitosan | 58.2% | 50000 | 1.0% |
| Example 49 | Polyvinylidene fluoride | 59.3% | 160000 | 1.5% | Carboxymethyl chitosan | 56.5% | 100000 | 1.0% |
| Example 50 | Polyvinylidene fluoride | 59.3% | 160000 | 1.5% | Carboxymethyl chitosan | 55.0% | 150000 | 1.0% |
| Example 51 | Polyvinylidene fluoride | 59.3% | 160000 | 1.5% | Carboxymethyl chitosan | 55.1% | 200000 | 1.0% |

TABLE 6

| No. | First polymer | First cladding layer Amount α of functional group | Number average molecular weight | Coating amount W1 | Second polymer | Second cladding layer Amount β of functional group | Number average molecular weight | Coating amount W2 | W1 + W2 |
|---|---|---|---|---|---|---|---|---|---|
| Example 52 | Polyvinylidene fluoride | 59.3% | 160000 | 0.5% | Carboxymethyl chitosan | 59.9% | 22000 | 2.0% | 2.5% |
| Example 53 | Polyvinylidene fluoride | 59.3% | 160000 | 1.0% | Carboxymethyl chitosan | 59.9% | 22000 | 1.5% | 2.5% |
| Example 54 | Polyvinylidene fluoride | 59.3% | 160000 | 2.0% | Carboxymethyl chitosan | 59.9% | 22000 | 0.5% | 2.5% |
| Example 55 | Polyvinylidene fluoride | 59.3% | 160000 | 0.1% | Carboxymethyl chitosan | 59.9% | 22000 | 1.2% | 1.3% |
| Example 56 | Polyvinylidene fluoride | 59.3% | 160000 | 0.5% | Carboxymethyl chitosan | 59.9% | 22000 | 1.2% | 1.7% |

TABLE 6-continued

| | First cladding layer | | | | Second cladding layer | | | |
|---|---|---|---|---|---|---|---|---|
| No. | First polymer | Amount α of functional group | Number average molecular weight | Coating amount W1 | Second polymer | Amount β of functional group | Number average molecular weight | Coating amount W2 | W1 + W2 |
| Example 57 | Polyvinylidene fluoride | 59.3% | 160000 | 1.0% | Carboxymethyl chitosan | 59.9% | 22000 | 1.2% | 2.2% |
| Example 58 | Polyvinylidene fluoride | 59.3% | 160000 | 1.5% | Carboxymethyl chitosan | 59.9% | 22000 | 1.2% | 2.7% |
| Example 59 | Polyvinylidene fluoride | 59.3% | 160000 | 2.0% | Carboxymethyl chitosan | 59.9% | 22000 | 1.2% | 3.2% |
| Example 60 | Polyvinylidene fluoride | 59.3% | 160000 | 2.5% | Carboxymethyl chitosan | 59.9% | 22000 | 1.2% | 3.7% |

TABLE 7

| No. | Lattice change rate (%) | Li/Mn anti-site defect concentration (%) | Surface oxygen valence | Compaction density g/cm$^3$ | Leaching out of Mn and Fe after cycling (ppm) | Initial specific capacity of button battery mAh/g | 3 C charging constant current ratio (%) | Number of cycles at capacity retention of 80% @45° C. | Expansion rate of battery at 60° C. storage (%) |
|---|---|---|---|---|---|---|---|---|---|
| Example 1 | 6.3 | 1.2 | −1.82 | 2.13 | 60 | 153.8 | 65.8 | 810 | 8.4 |
| Example 28 | 6.3 | 1.2 | −1.82 | 2.13 | 62 | 153.3 | 65.5 | 787 | 8.5 |
| Example 29 | 6.4 | 1.3 | −1.82 | 2.12 | 66 | 153.4 | 65.6 | 779 | 8.4 |
| Example 30 | 6.3 | 1.2 | −1.82 | 2.13 | 60 | 153.4 | 65.7 | 792 | 8.4 |
| Example 31 | 6.2 | 1.2 | −1.82 | 2.14 | 63 | 153.3 | 65.5 | 778 | 8.3 |
| Example 32 | 6.3 | 1.1 | −1.82 | 2.12 | 70 | 153.4 | 65.4 | 758 | 8.4 |
| Example 33 | 6.3 | 1.2 | −1.82 | 2.13 | 68 | 153.4 | 65.5 | 761 | 8.5 |
| Example 34 | 6.2 | 1.3 | −1.82 | 2.14 | 72 | 153.2 | 65.6 | 755 | 8.4 |
| Example 35 | 6.3 | 1.2 | −1.82 | 2.13 | 110 | 153.4 | 65.4 | 683 | 8.4 |
| Example 36 | 6.4 | 1.1 | −1.82 | 2.12 | 104 | 153.4 | 65.5 | 694 | 8.3 |
| Example 37 | 6.3 | 1.2 | −1.82 | 2.14 | 121 | 153.3 | 65.3 | 676 | 8.3 |
| Example 38 | 6.2 | 1.2 | −1.82 | 2.13 | 135 | 153.2 | 65.4 | 655 | 8.4 |
| Example 39 | 6.2 | 1.2 | −1.82 | 2.11 | 67 | 153.3 | 65.4 | 777 | 8.4 |
| Example 40 | 6.3 | 1.1 | −1.82 | 2.13 | 68 | 153.2 | 65.4 | 781 | 8.4 |
| Example 41 | 6.4 | 1.3 | −1.82 | 2.12 | 66 | 153.4 | 65.5 | 786 | 8.3 |
| Example 42 | 6.4 | 1.3 | −1.82 | 2.11 | 65 | 153.4 | 65.4 | 790 | 8.4 |
| Example 43 | 6.4 | 1.1 | −1.82 | 2.11 | 69 | 153.2 | 65.3 | 779 | 8.5 |
| Example 44 | 6.3 | 1.2 | −1.82 | 2.11 | 71 | 152.8 | 64.8 | 771 | 8.4 |
| Example 45 | 6.4 | 1.2 | −1.82 | 2.12 | 74 | 151.7 | 64.3 | 759 | 8.3 |
| Example 46 | 6.3 | 1.3 | −1.82 | 2.11 | 67 | 153.3 | 65.5 | 791 | 8.3 |
| Example 47 | 6.3 | 1.2 | −1.82 | 2.12 | 63 | 153.4 | 65.4 | 803 | 8.4 |
| Example 48 | 6.3 | 1.3 | −1.82 | 2.11 | 65 | 153.2 | 65.3 | 787 | 8.2 |
| Example 49 | 6.4 | 1.1 | −1.82 | 2.11 | 66 | 153.1 | 65.0 | 772 | 8.3 |
| Example 50 | 6.3 | 1.2 | −1.82 | 2.11 | 69 | 152.3 | 64.4 | 750 | 8.2 |
| Example 51 | 6.4 | 1.2 | −1.82 | 2.12 | 76 | 151.9 | 64.0 | 736 | 8 |

TABLE 8

| No. | Lattice change rate (%) | Li/Mn anti-site defect concentration (%) | Surface oxygen valence | Compaction density g/cm$^3$ | Leaching out of Mn and Fe after cycling (ppm) | Initial specific capacity of button battery mAh/g | 3 C charging constant current ratio (%) | Number of cycles at capacity retention of 80% @45° C. | Expansion rate of battery at 60° C. storage (%) |
|---|---|---|---|---|---|---|---|---|---|
| Example 52 | 6.3 | 1.2 | −1.82 | 2.12 | 55 | 151.7 | 64.2 | 748 | 8.4 |
| Example 53 | 6.2 | 1.2 | −1.82 | 2.14 | 57 | 152.6 | 64.6 | 779 | 8.3 |
| Example 54 | 6.2 | 1.2 | −1.82 | 2.12 | 64 | 152.7 | 65.0 | 724 | 8.4 |
| Example 55 | 6.3 | 1.1 | −1.82 | 2.13 | 84 | 153.5 | 65.5 | 740 | 8.3 |
| Example 56 | 6.3 | 1.3 | −1.82 | 2.14 | 76 | 153.3 | 65.4 | 755 | 8.4 |
| Example 57 | 6.4 | 1.2 | −1.82 | 2.13 | 71 | 153.4 | 65.4 | 792 | 8.4 |
| Example 58 | 6.3 | 1.1 | −1.82 | 2.12 | 61 | 152.9 | 65.1 | 803 | 8.5 |
| Example 59 | 6.4 | 1.2 | −1.82 | 2.12 | 58 | 152.3 | 64.3 | 751 | 8.4 |
| Example 60 | 6.3 | 1.2 | −1.82 | 2.13 | 57 | 151.2 | 63.6 | 727 | 8.3 |

From Tables 7 and 8 above, it can be seen that in the case of other elements being the same, selecting a first polymer satisfying one or more of a suitable content of electron-absorbing group, number-average molecular weight, and coating amount as a first cladding layer, and/or selecting a second polymer satisfying one or more of a suitable amount of substituent in sugar unit, number-average molecular weight, and coating amount as a second cladding layer, can further improve the cycling performance of the secondary battery without affecting the energy density and the kinetic performance.

It should be noted that this application is not limited to the above embodiments. The above embodiments are only provided as examples, and within the technical solution of the present application, embodiments having substantially the same configuration as the technical idea and exerting the same effects are all included within the technical scope of the present application. In addition, various modifications to the embodiments that can be conceived by those skilled in the art without departing from the scope of the spirit of the present application and other embodiments constructed by combining some constituent elements in the embodiments are also included in the scope of the present application.

What is claimed is:

1. A positive electrode active material having a core-shell structure, comprising a core, a first cladding layer covering the core and a second cladding layer covering the first cladding layer,
   wherein the core has a chemical formula of $Li_aA_xMn_{1-y}B_yP_{1-z}C_zO_{4-n}D_n$, in which A comprises one or more elements selected from Zn, Al, Na, K, Mg, Nb, Mo and W, B comprises one or more elements selected from Ti, V, Zr, Fe, Ni, Mg, Co, Ga, Sn, Sb, Nb, and Ge, C comprises one or more elements selected from B (boron), S, Si, and N, D comprises one or more elements selected from S, F, Cl, and Br, a is in a range of 0.9 to 1.1, x is in a range of 0.001 to 0.1, y is in a range of 0.001 to 0.5, z is in a range of 0.001 to 0.1, n is in a range of 0.001 to 0.1, and the core is electrically neutral;
   wherein the cladding layer comprises a first polymer containing an electron withdrawing group; and
   wherein the second cladding layer comprises a second polymer, the second polymer comprises one or more of plant polysaccharides, marine polysaccharides and the derivatives thereof.

2. The positive electrode active material according to claim 1, wherein the electron withdrawing group comprises one or more selected from halogen atoms, —CN, —COOH, —SO$_3$H, carboxylate groups, sulfonate groups, amide groups, sulfonyl groups, alkoxy groups, phosphoric acid groups, phosphorous acid groups, phosphate groups, and phosphite groups.

3. The positive electrode active material according to claim 1, wherein the first polymer comprises a monomer unit shown in Formula 1

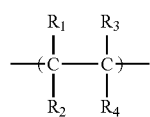

Formula 1

$R_1$, $R_2$, $R_3$, and $R_4$ each independently represent H, an electron withdrawing group, and an unsubstituted or an electron withdrawing group-substituted group selected from the group consisting of C1 to C20 alkyl, C1 to C20 alkoxy, C2 to C20 alkenyl, C2 to C20 alkynyl, and C6 to C20 aryl; and at least one of $R_1$, $R_2$, $R_3$, and $R_4$ represents an electron withdrawing group, or an electron withdrawing group-substituted group selected from the group consisting of C1 to C20 alkyl, C1 to C20 alkoxy, C2 to C20 alkenyl, C2 to C20 alkynyl, and C6 to C20 aryl, the first polymer comprises one or more of a homopolymer formed by one kind of monomer unit shown in Formula 1, a copolymer formed by at least two kinds of monomer units shown in Formula 1, and a copolymer formed by at least one kind of monomer unit shown in Formula 1 and at least one ethylenically unsaturated monomer unit; and optionally, the ethylenically unsaturated monomer unit comprises one or more of styrene, ethylene, propylene, and butadiene.

4. The positive electrode active material according to claim 1, wherein the first polymer comprises one or more selected from homopolymers or copolymers of acrylate monomers; polyacrylonitrile; polyacrylamide; copolymers of acrylate monomers and ethylenically unsaturated monomers; copolymers of acrylonitrile and ethylenically unsaturated monomers; copolymers of acrylamide and ethylenically unsaturated monomers; copolymers of acrylate monomers and acrylonitrile; copolymers of acrylate monomers and acrylamide; copolymers of acrylonitrile and acrylamide; copolymers of acrylate monomers, acrylonitrile and acrylamide; copolymers of acrylate monomers, acrylonitrile, acrylamide, and ethylenically unsaturated monomers; halogen-substituted polyolefin; polystyrene malonic acid; polystyrene phosphorous acid; poly (2-acrylamido-2-methyl-1-propanesulfonic acid); nitrile rubber; mercaptan resin; and polyacrylic acid mercaptan resin,
   the acrylate monomer comprises one or more selected from acrylic acid, methacrylic acid, methyl acrylate, ethyl acrylate, methyl methacrylate, ethyl methacrylate, butyl methacrylate, and cyanoacrylate,
   the halogen-substituted polyolefin comprises one or more selected from polyvinylidene fluoride, tetrafluoroethylene-ethylene copolymer, polyvinylidene chloride, and polychloromethylstyrene.

5. The positive electrode active material according to claim 1, wherein the substituent attached to the sugar unit in the second polymer comprises at least one of the group selected from the following functional groups: —OH, —COOH and the salts thereof, —R—OH, —SO$_3$H and the salts thereof, —R—OH, —R—SO$_3$H and the salts thereof, sulphate group, alkoxy group, and R represents alkylidene, optionally, C1~C5 alkylidene;
   the substituent attached to the sugar unit in the second polymer comprises at least one of the group selected from the following functional groups: —OH, —COOH, —COOLi, —COONa, —COOK, —SO$_3$H, —SO$_3$Li, —SO$_3$Na, —SO$_3$K, —CH$_2$—SO$_3$H, —CH$_2$—SO$_3$Li, —CH$_2$—SO$_3$Na, —CH$_2$—SO$_3$K, methoxy, and ethoxy.

6. The positive electrode active material according to claim 1, wherein the plant polysaccharide comprises one or more selected from pectin, carboxymethyl starch, hydroxypropyl starch, dextrin, cellulose ether, carboxymethyl chitosan, hydroxyethyl cellulose, carboxymethyl cellulose, carboxypropylmethyl cellulose, guar gum, sesbania gum, gum arabic, and the modified polymers thereof; and
   the marine polysaccharide comprises one or more selected from lithium alginate, sodium alginate, potassium alginate, fucoidan, agar, carrageenan, carrageenin, xanthan gum, fenugreek gum and the modified polymers thereof.

7. The positive electrode active material according to claim 1, wherein the first polymer has a number average molecular weight of 10,000 to 300,000, optionally of 15,000 to 250,000; and/or
wherein the second polymer has a number average molecular weight of 10,000 to 150,000, optionally of 50,000 to 100,000.

8. The positive electrode active material according to claim 1, wherein the electron withdrawing group is present in a mass percentage α in the first polymer, with α being from 20% to 70%, optionally from 35% to 65%; and/or
wherein the substituents attached to the sugar units are present in a mass percentage β in the second polymer, with β being from 20% to 85%, optionally from 30% to 78%.

9. The positive electrode active material according to claim 1, wherein
the first cladding layer has a coating amount W1, with W1 being greater that 0 and less than or equal to 2.5 wt %, based of the weight of the core;
the second cladding layer has a coating amount W2, with W2 being greater that 0 and less than or equal to 2 wt %, based on the weight of the core.

10. The positive electrode active material according to claim 9, wherein W1+W2≤3.5 wt %.

11. The positive electrode active material according to claim 1, wherein
the first cladding layer is disposed on 60% to 95% of the surface of the core, and
the second cladding layer is disposed on 40% to 80% of the surface of the first cladding layer.

12. The positive electrode active material according to claim 1, wherein each of A, C and D is independently any one element in the above-mentioned respective range, and B is at least two elements in its range;
A is any one element selected from Mg and Nb, and
B is at least two elements selected from Fe, Ti, V, Co and Mg, further optionally being a combination of Fe with one or more elements selected from Ti, V, Co and Mg,
C is S, and
D is F.

13. The positive electrode active material according to claim 1, wherein the x is selected from a range of 0.001 to 0.005; the y is selected from a range of 0.01 to 0.5; the z is selected from a range of 0.001 to 0.005; the n is selected from a range of 0.001 to 0.005.

14. The positive electrode active material according to claim 1, wherein a ratio of (1−y):y is in a range of 1 to 4, and a ratio of a:x is in a range of 9 to 1100.

15. The positive electrode active material according to claim 1, wherein the positive electrode active material satisfies at least one of the following (1) to (4):
(1) the positive electrode active material has a lattice change rate of 8% or less, optionally 4% or less;
(2) the positive electrode active material has a Li/Mn anti-site defect concentration of 2% or less, optionally 0.5% or less;
(3) the positive electrode active material has a surface oxygen valence of −1.82 or less, optionally −1.89 to −1.98; and
(4) the positive electrode active material has a compaction density of 2.0 g/cm$^3$ or more, optionally 2.2 g/cm$^3$ or more, at 3T.

16. A method for preparing a positive electrode active material, the method comprising:
Step (1), dissolving a manganese source, a source of element B and an acid in a solvent and stirring to produce a suspension of a manganese salt doped with element B, filtering the suspension and drying the resulting filter cake to obtain the manganese salt doped with element B;
Step (2), adding a lithium source, a phosphorus source, a source of element A, a source of element C and a source of element D, a solvent and the manganese salt doped with element B obtained from step (1) to a reaction vessel for grinding and mixing to obtain a slurry;
Step (3), transferring the slurry obtained from step (2) to a spray drying equipment for spray drying and granulating to obtain granules;
Step (4), sintering the granules obtained from step (3) to obtain a core;
Step (5), mixing the core obtained from step (4) with a solution of a first polymer containing an electron withdrawing group homogeneously and then drying to obtain a material covered by a first cladding layer;
Step (6), mixing the material covered by the first cladding layer obtained from step (5) with a solution of a second polymer homogeneously and then drying to obtain the positive electrode active material, wherein the second polymer comprises one or more of plant polysaccharides, marine polysaccharides and the derivatives thereof;
wherein the positive electrode active material has a core-shell structure, comprising a core, a first cladding layer covering the core and a second cladding layer covering the first cladding layer,
wherein the core has a chemical formula of $Li_aA_xMn_{1-y}B_yP_{1-z}C_zO_{4-n}D_n$, in which A comprises one or more elements selected from Zn, Al, Na, K, Mg, Nb, Mo and W, B comprises one or more elements selected from Ti, V, Zr, Fe, Ni, Mg, Co, Ga, Sn, Sb, Nb, and Ge, C comprises one or more elements selected from B (boron), S, Si, and N, D comprises one or more elements selected from S, F, Cl, and Br, a is in a range of 0.9 to 1.1, x is in a range of 0.001 to 0.1, y is in a range of 0.001 to 0.5, z is in a range of 0.001 to 0.1, n is in a range of 0.001 to 0.1, and the core is electrically neutral;
wherein the first cladding layer comprises the polymer containing an electron withdrawing group; and
wherein the second cladding layer comprises a second polymer, the second polymer comprises one or more of plant polysaccharides, marine polysaccharides and the derivatives thereof.

17. The method according to claim 16, wherein
the source of element A is at least one selected from elemental substance, oxides, phosphates, oxalates, carbonates and sulfates of element A,
the source of element B is at least one selected from elemental substance, oxides, phosphates, oxalates, carbonates and sulfates of element B,
the source of element C is at least one selected from sulfates, borates, nitrates and silicates of element C, and
the source of element D is at least one selected from elemental substance and ammonium salts of element D.

18. The method according to claim 16, wherein the stirring in the step (1) is carried out at a temperature in a range of 60-120° C., and the stirring in the step (1) is carried out by stirring at a rate of 200-800 rpm.

19. The method according to claim 16, wherein grinding and mixing in the step (2) are carried out for 8-15 hours.

20. The method according to claim 16, wherein the sintering in the step (4) is carried out at a temperature in a range of 600-900° C. for 6-14 hours.

21. A positive electrode plate comprising a positive electrode current collector and a positive electrode film layer provided on at least one surface of the positive electrode current collector, wherein the positive electrode film layer comprises the positive electrode active material according to claim 1, and the positive electrode active material is present in the positive electrode film layer in a content of 10 wt % or more, based on total weight of the positive electrode film layer.

22. A secondary battery comprising the positive electrode active material according to claim 1.

23. An electrical device comprising the secondary battery according to claim 22.

\* \* \* \* \*